(12) United States Patent
Fanzani et al.

(10) Patent No.: US 10,458,559 B2
(45) Date of Patent: Oct. 29, 2019

(54) DOUBLE FLAPPER VALVE FOR A VARIABLE CAM TIMING SYSTEM

(71) Applicant: BorgWarner Inc., Auburn Hills, MI (US)

(72) Inventors: Augusto Fanzani, Gessate (IT); Maino Bruno, Monza (IT)

(73) Assignee: BorgWarner, inc., Auburn Hills, MI (US)

( * ) Notice: Subject to any disclaimer, the term of this patent is extended or adjusted under 35 U.S.C. 154(b) by 196 days.

(21) Appl. No.: 15/723,367

(22) Filed: Oct. 3, 2017

(65) Prior Publication Data

US 2018/0100595 A1    Apr. 12, 2018

Related U.S. Application Data

(60) Provisional application No. 62/404,874, filed on Oct. 6, 2016.

(51) Int. Cl.
| | |
|---|---|
| *F16K 15/14* | (2006.01) |
| *F16K 15/18* | (2006.01) |
| *F16K 27/02* | (2006.01) |
| *F01L 1/344* | (2006.01) |

(52) U.S. Cl.
CPC .......... *F16K 15/144* (2013.01); *F16K 15/185* (2013.01); *F16K 27/0209* (2013.01); *F01L 1/3442* (2013.01); *F01L 2001/34426* (2013.01)

(58) Field of Classification Search
CPC ...... F16K 15/144; F16K 15/16; F16K 15/185; F16K 27/0209; F01L 1/34409; F01L 1/3442; F01L 2001/34426; F01L 2001/3443; F01L 2101/00; F01L 2250/04; F01L 2250/06; F01L 2820/01

See application file for complete search history.

(56) References Cited

U.S. PATENT DOCUMENTS

| | | | |
|---|---|---|---|
| 4,550,749 | A | 11/1985 | Krikorian |
| 4,556,086 | A | 12/1985 | Raines |
| 4,958,661 | A | 9/1990 | Holtermann et al. |
| 5,453,097 | A | 9/1995 | Paradis |
| 5,462,253 | A | 10/1995 | Asthana et al. |
| 5,971,723 | A | 10/1999 | Bolt et al. |
| 6,022,199 | A | 2/2000 | Yoshii et al. |
| 6,659,094 | B2 | 12/2003 | Nakamizo et al. |
| 6,705,260 | B2 | 3/2004 | Lewis et al. |

(Continued)

FOREIGN PATENT DOCUMENTS

| | | |
|---|---|---|
| DE | 102010026853 A1 | 1/2012 |
| DE | 102012212243 A1 | 1/2014 |

(Continued)

*Primary Examiner* — P. Macade Nichols
(74) *Attorney, Agent, or Firm* — Reising Ethington P.C.

(57) ABSTRACT

An inlet check valve for controlling fluid from a supply into a variable cam timing phaser includes a double flapper check valve assembly with an open position and a closed position, which includes a housing having a body forming at least two stoppers, a flapper valve comprising at least two flexible flaps received within the housing and aligned with the at least two stoppers, and a valve seat received within the housing, the valve seat defining openings aligned with the at least two flexible flaps, axially opposite the two stoppers. In another embodiment, the stoppers are on a stopper piece separate from the housing.

15 Claims, 33 Drawing Sheets

(56) References Cited

U.S. PATENT DOCUMENTS

| | | |
|---|---|---|
| 6,899,126 B2 | 5/2005 | Weigand et al. |
| 7,370,645 B2 | 5/2008 | Freeman et al. |
| 7,533,695 B2 | 5/2009 | Strauss et al. |
| 7,779,859 B2 | 8/2010 | Denike et al. |
| 8,316,889 B2 | 11/2012 | Hoppe et al. |
| 8,684,041 B2 | 4/2014 | Konias et al. |
| 8,695,550 B2 | 4/2014 | Ikuma |
| 8,869,761 B2 | 10/2014 | Busse et al. |
| 8,904,980 B2 | 12/2014 | Hayashi et al. |
| 8,959,896 B2 | 2/2015 | Yanagida |
| 8,967,106 B2 | 3/2015 | Bayrakdar |
| 8,973,543 B2 | 3/2015 | Hayashi |
| 9,046,181 B2 | 6/2015 | Patzold et al. |
| 9,243,621 B2 | 1/2016 | Moroi et al. |
| 9,309,979 B2 | 4/2016 | Russell |
| 9,394,809 B2 | 7/2016 | Gruber et al. |
| 9,394,898 B2 | 7/2016 | Fellmeth et al. |
| 9,453,438 B2 | 9/2016 | Ikuma et al. |
| 9,488,077 B2 | 11/2016 | Suzuki et al. |
| 9,598,984 B2 | 3/2017 | Bayrakdar et al. |
| 9,598,987 B2 | 3/2017 | Bayrakdar |
| 9,719,605 B2 | 8/2017 | Ross et al. |
| 9,777,719 B2 | 10/2017 | Usui et al. |
| 9,909,463 B2 | 3/2018 | Schulze et al. |
| 10,036,286 B2 | 7/2018 | Camilo et al. |
| 10,107,153 B2 | 10/2018 | Boese et al. |
| 2002/0162595 A1 | 11/2002 | Lee et al. |
| 2006/0096562 A1 | 5/2006 | Pluta et al. |
| 2010/0181518 A1 | 7/2010 | Kowalski |
| 2010/0288384 A1* | 11/2010 | Hoppe .................. F01L 1/344 137/843 |
| 2012/0234408 A1 | 9/2012 | Tornquist et al. |
| 2012/0312396 A1 | 12/2012 | Hoppe et al. |
| 2013/0052066 A1 | 2/2013 | Moroi et al. |
| 2013/0118622 A1* | 5/2013 | Patzold ................ F01L 1/3442 137/855 |
| 2014/0345713 A1 | 11/2014 | Pirovano et al. |
| 2015/0292368 A1 | 10/2015 | Hayashi |
| 2015/0292369 A1 | 10/2015 | Hayashi |
| 2016/0146362 A1 | 5/2016 | Solarz |
| 2016/0201822 A1 | 7/2016 | Takada |
| 2017/0260883 A1 | 9/2017 | Benischek et al. |
| 2017/0260885 A1 | 9/2017 | Bayrakdar |
| 2018/0100595 A1 | 4/2018 | Fanzani et al. |
| 2018/0128388 A1 | 5/2018 | Ferus et al. |
| 2018/0135472 A1 | 5/2018 | Kajita et al. |
| 2018/0202328 A1 | 7/2018 | De Oliveira Ghiraldi et al. |
| 2018/0245488 A1 | 8/2018 | Hamasaki et al. |
| 2018/0334931 A1 | 11/2018 | Camilo et al. |

FOREIGN PATENT DOCUMENTS

| | | |
|---|---|---|
| WO | 2013/011348 A1 | 1/2013 |
| WO | 2017/088859 A1 | 1/2017 |
| WO | 2018062479 A1 | 4/2018 |
| WO | 2018/135584 A1 | 7/2018 |

* cited by examiner

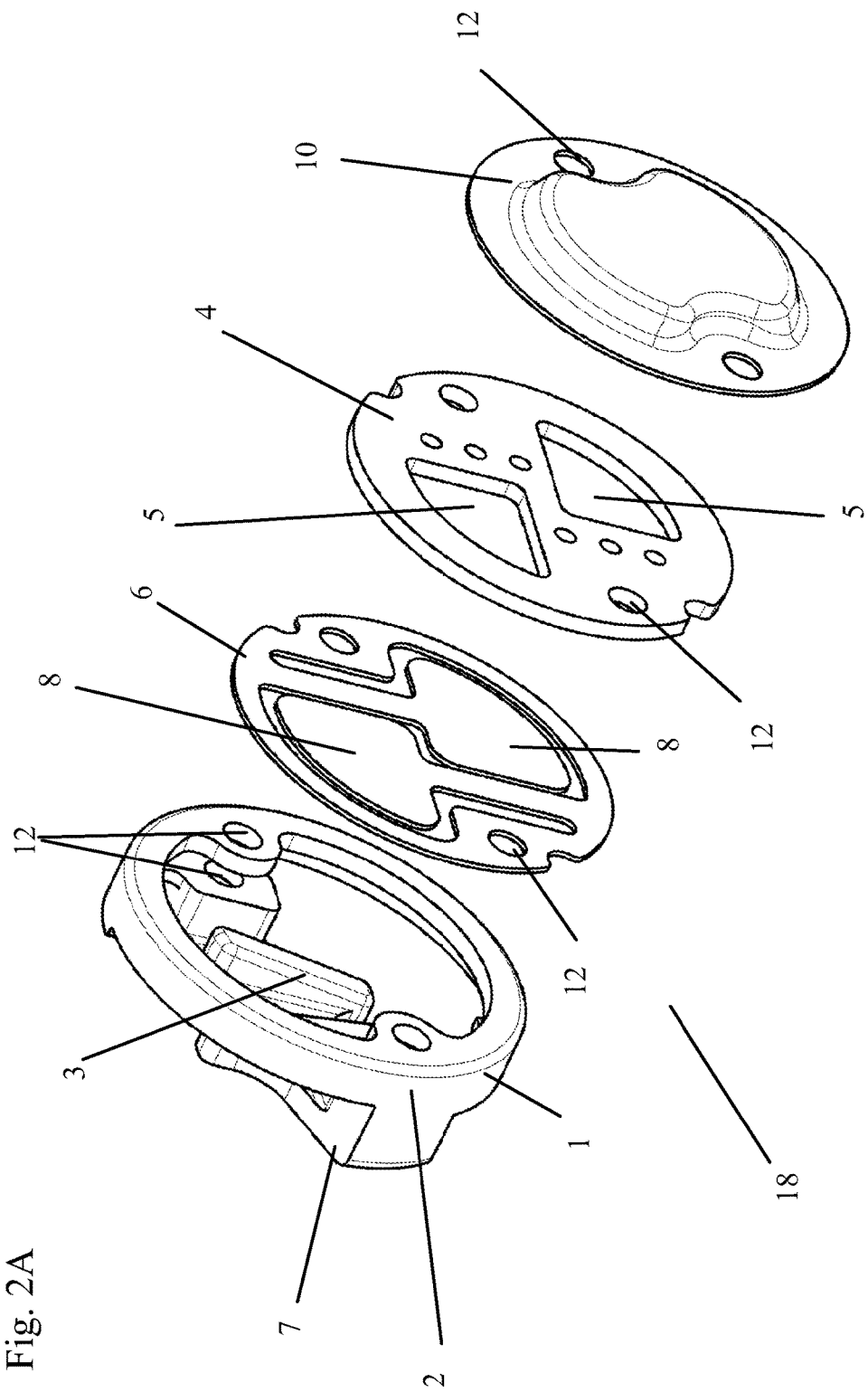

Fig. 13A
Fig. 13B
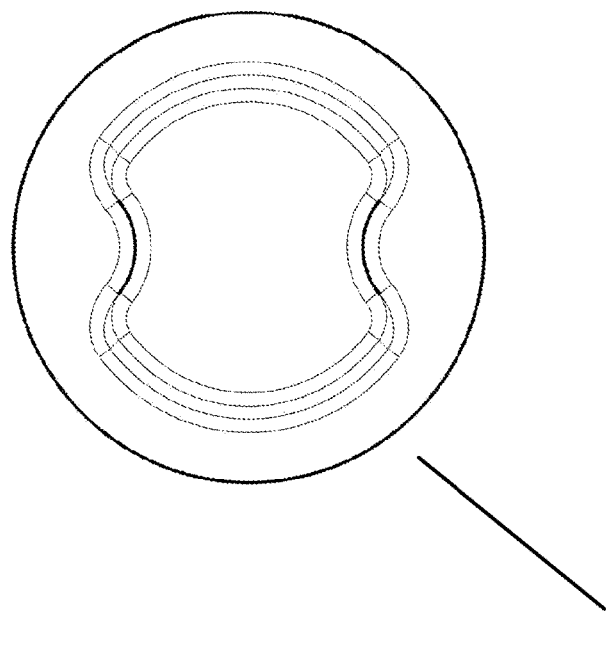
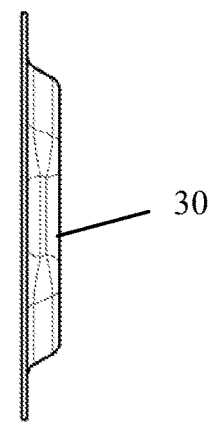
30
30
Fig. 13C
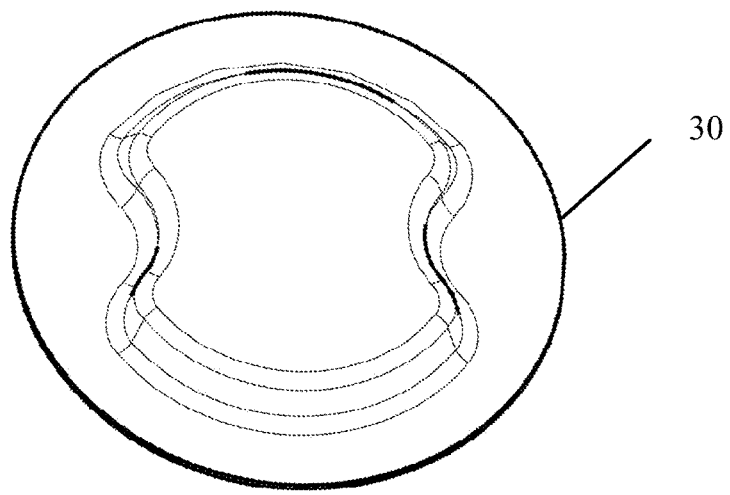
30

DOUBLE FLAPPER VALVE FOR A VARIABLE CAM TIMING SYSTEM

CROSS-REFERENCE TO RELATED APPLICATIONS

This application claims the benefit of U.S. Patent Application No. 62/404,874 filed on Oct. 6, 2016, the disclosure of which is herein incorporated by reference in its entirety.

BACKGROUND OF THE INVENTION

Field of the Invention

The invention pertains to the field of check valves. More particularly, the invention pertains to a double flapper valve for a variable cam timing system.

Description of Related Art

Internal combustion engines have employed various mechanisms to vary the relative timing between the camshaft and the crankshaft for improved engine performance or reduced emissions. The majority of these variable camshaft timing (VCT) mechanisms use one or more "vane phasers" on the engine camshaft (or camshafts, in a multiple-camshaft engine). Vane phasers have a rotor with one or more vanes, mounted to the end of the camshaft, surrounded by a housing assembly with the vane chambers into which the vanes fit. It is possible to have the vanes mounted to the housing assembly, and the chambers in the rotor assembly, as well. The housing's outer circumference forms the sprocket, pulley or gear accepting drive force through a chain, belt, or gears, usually from the crankshaft, or possibly from another camshaft in a multiple-cam engine.

Apart from the camshaft torque actuated (CTA) variable camshaft timing (VCT) systems, the majority of hydraulic VCT systems operate under two principles, oil pressure actuation (OPA) or torsion assist (TA). In the oil pressure actuated VCT systems, an oil control valve (OCV) directs engine oil pressure to one working chamber in the VCT phaser while simultaneously venting the opposing working chamber defined by the housing assembly, the rotor assembly, and the vane. This creates a pressure differential across one or more of the vanes to hydraulically push the VCT phaser in one direction or the other. Neutralizing or moving the valve to a null position puts equal pressure on opposite sides of the vane and holds the phaser in any intermediate position. If the phaser is moving in a direction such that valves will open or close sooner, the phaser is said to be advancing and if the phaser is moving in a direction such that valves will open or close later, the phaser is said to be retarding.

The torsional assist (TA) systems operates under a similar principle with the exception that it has one or more check valves to prevent the VCT phaser from moving in a direction opposite than being commanded, should it incur an opposing force such as a torque impulse caused by cam operation.

Prior art inlet check valves for variable cam timing systems include a single opening and a ball check valve.

SUMMARY OF THE INVENTION

An inlet check valve for controlling fluid from a supply into a variable cam timing phaser includes a double flapper check valve assembly with an open position and a closed position. The double flapper check valve includes a housing having a body forming at least two stoppers, a flapper valve comprising at least two flexible flaps received within the housing and aligned with the at least two stoppers, and a valve seat received within the housing, the valve seat defining openings aligned with the at least two flexible flaps, axially opposite the two stoppers. When fluid flows through the openings of the valve seat, the fluid pushes the at least two flaps away from the valve seat and towards the at least two stoppers, permitting the flow of fluid into the variable cam timing phaser. When fluid flows from the body onto the at least two flaps, the fluid pushes the at least two flaps towards the valve seat, sealing the openings of the valve seat and preventing fluid from entering the supply.

An inlet check valve for controlling fluid from a supply into a variable cam timing phaser includes a double flapper check valve assembly with an open position and a closed position. The double flapper check valve assembly includes a housing having a body, a flapper valve comprising at least two flexible flaps received within the housing, a stopper piece comprising two stopper wings aligned with the at least two flexible flaps and a valve seat received within the housing, the valve seat defining openings aligned with the at least two flexible flaps, axially opposite the two stopper wings. When fluid flows through the openings of the valve seat, the fluid pushes the at least two flaps away from the valve seat and towards the at least two stopper wings, permitting the flow of fluid into the variable cam timing phaser. When fluid flows from the body onto the at least two flaps, the fluid pushes the at least two flaps towards the valve seat, sealing the openings of the valve seat and preventing fluid from entering the supply.

BRIEF DESCRIPTION OF THE DRAWINGS

FIG. 2A shows an exploded view of the components of the double flapper valve in the first embodiment.

FIG. 13A shows a bottom view of a filter in the second embodiment.

FIG. 13B shows a side view of a filter in the second embodiment.

FIG. 13C shows a top perspective view of a filter in the second embodiment.

DETAILED DESCRIPTION OF THE INVENTION

Figure 1A:
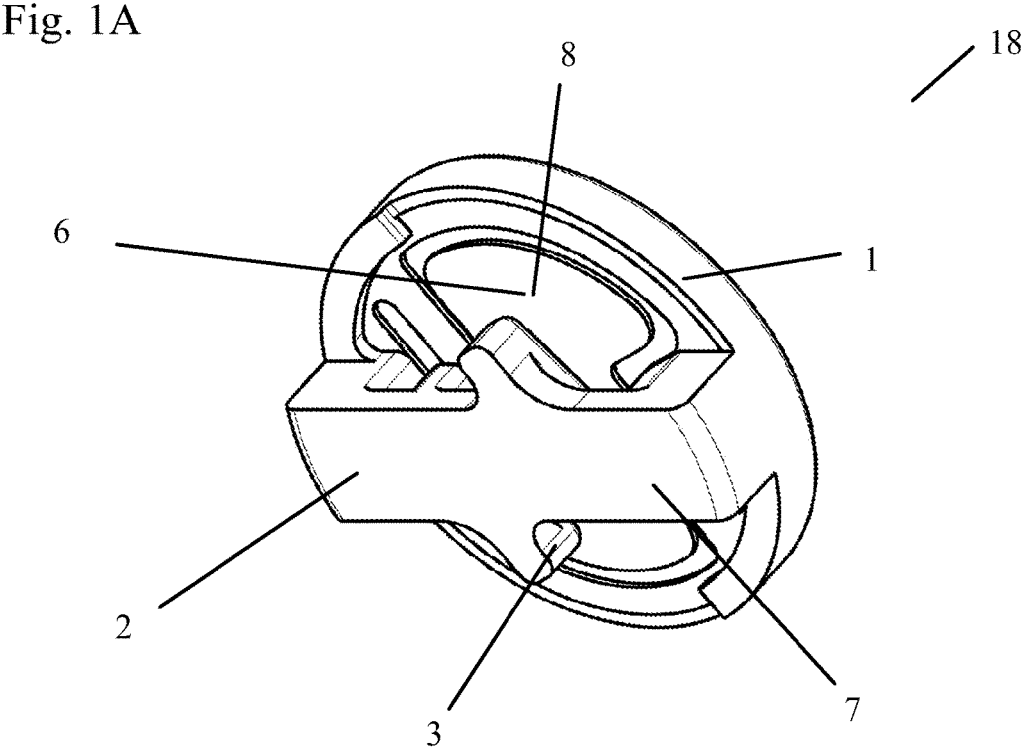
FIG. 1A shows a bottom isometric view of a first embodiment of the double flapper valve assembly.

A control valve for a variable cam timing device includes an inlet check valve comprised of a flapper valve with two flaps which are preferably limited by stoppers. In some embodiments, the stoppers are part of a valve housing, which is preferably made by overmolding. In other embodiments, the stoppers are part of a separate stopper piece and the valve housing is preferably made by overmolding. Other processes, including but not limited to, other injection molding processes, may alternatively be used to make the housing or other components.

Using a double flapper valve as the inlet check valve in a variable cam timing system results in a significant and surprising benefit of a smaller package, better performance, and lower cost than prior art valves.

A double flapper valve permits high flow passage for a variable cam timing device. The double flapper valve acts as the inlet check valve for the variable cam timing device. The double flapper valve opens the oil inlet passage of a valve seat and the stroke of the valve is stopped when the flappers hit a stopper. The flapper valve is somewhat similar to shim valves used in shock absorbers for motorcycles or cars, but the present invention uses a double flap instead of a single shim. More specifically, the double flapper valve of the present invention uses a shim to open/close two oil passages instead of traditional valves that use a single passage opened and closed by a sphere, ball, or disk. The double flapper valve of the present invention improves the passage of inlet oil coming from the cam nose to the sleeve.

In one embodiment, there is one piece housing and the flapper valve assembly. In some embodiments, a filter is added to the back of the double flapper valve to prevent contamination. A valve housing includes stoppers that limit the stroke of the flaps of the flapper valve. The stoppers may alternatively be included on a valve assembly piece separate from the housing. The housing is preferably made using an overmolding process.

One preferred thickness for the valve is approximately 0.2 mm. In other preferred embodiments, the thickness is between approximately 0.1 mm and approximately 0.4 mm, but other thicknesses may be used depending upon the application. There are preferably two flapper valves, with a flow of approximately two to three times the flow of prior art inlet check valves. In some preferred embodiments, the flapper valves have a total passage of oil of about 40 mm$^2$. In contrast, prior art check valves with a ball diameter of 6.0 mm have a passage of oil of about 14.6 mm$^2$.

In some embodiments, the flapper valve is preferably assembled within a housing, which is preferably made by overmolding. The housing has stoppers to limit the stroke of the two flaps/wings of the valve at 1.3 mm. With this stroke, the opening passage is about 40 mm$^2$.

In some preferred embodiments, the housing is made of plastic, or plastic and fiber glass (e.g.—50% fiberglass). In some preferred embodiments, the double flapper valve and/ or the filter are made of steel. In some preferred embodiments, the valve seat is made of steel. In some embodiments with a separate stopper piece, the stopper piece with the stoppers is made of steel.

A first embodiment of the double flapper valve 18 is shown in FIGS. 1A-9. The double flapper valve portion of the valve assembly 18 opens the oil inlet passage created on a valve seat 4 and the stroke is stopped when the flaps 8 hit a stopper 3. The valve assembly 18 includes a housing 2, a double flapper valve portion 6 with two flaps 8, a valve seat 4 (shown in FIGS. 2A-2C) and an optional filter 10. The housing 2 includes a body 7 that forms two stoppers 3 that limit the dual flaps 8. The housing 2 also includes a lip 1 that surrounds the other double flapper check valve assembly components.

Figure 1B:
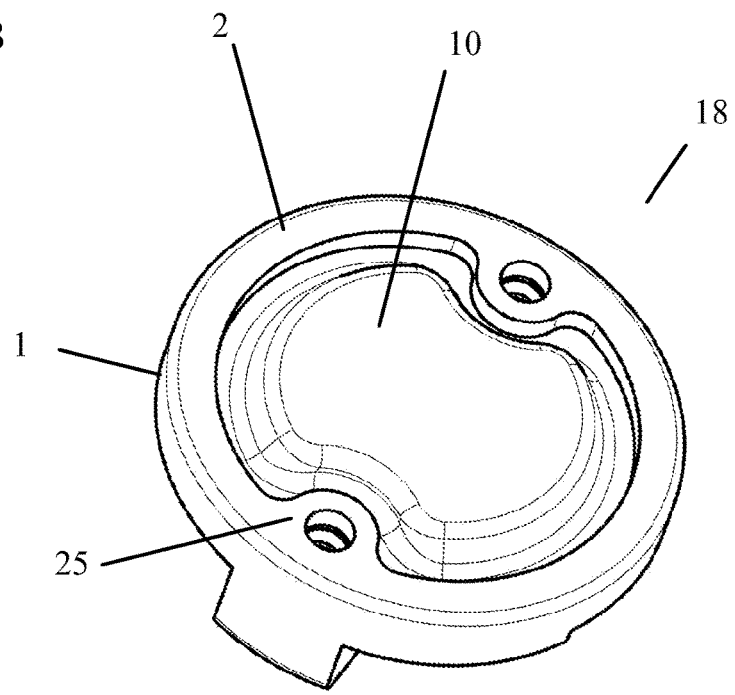
FIG. 1B shows a top isometric view of the first embodiment of the double flapper valve.
Figure 2B:
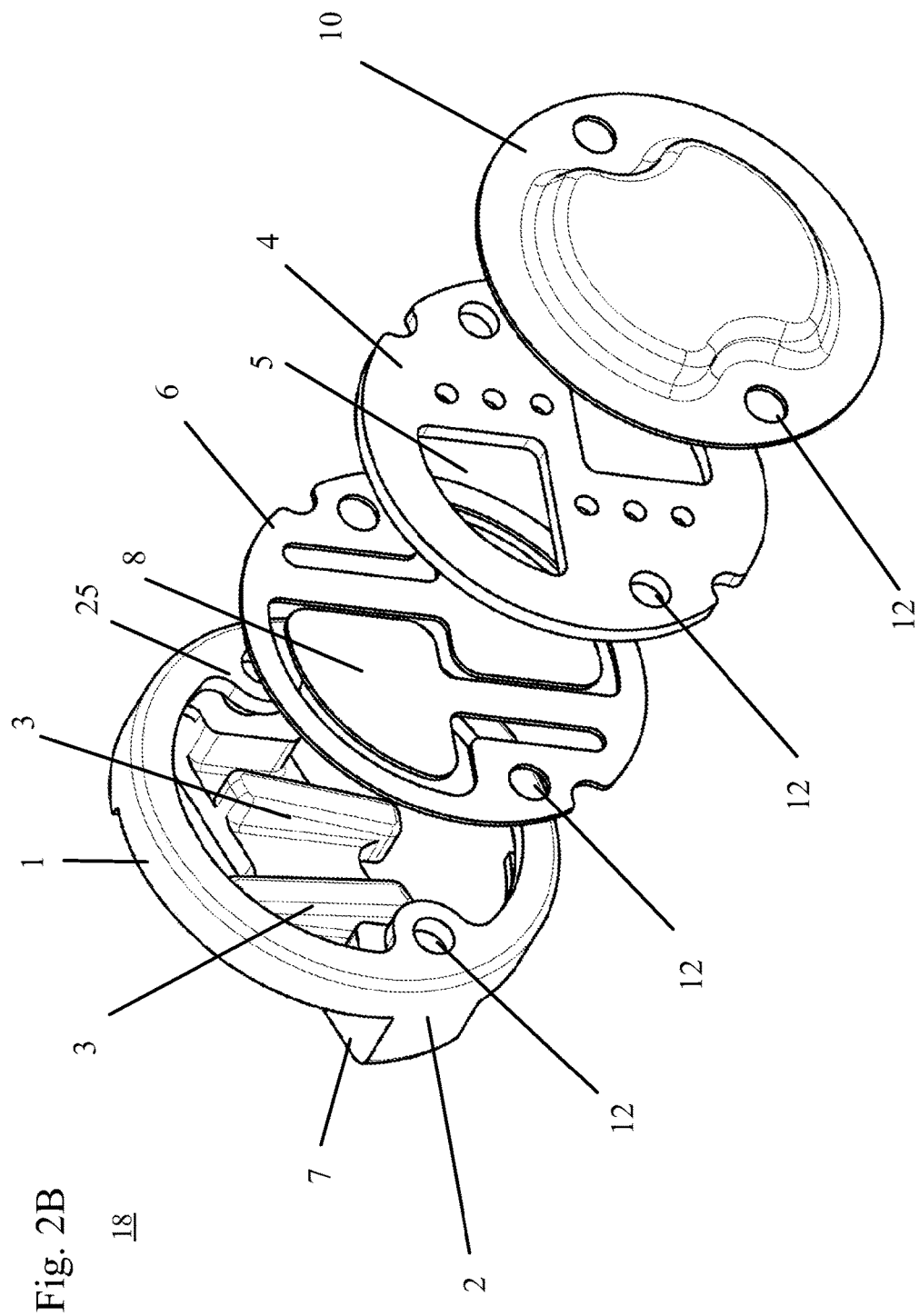
FIG. 2B shows another exploded view of the components of the double flapper valve in the first embodiment.
Figure 2C:
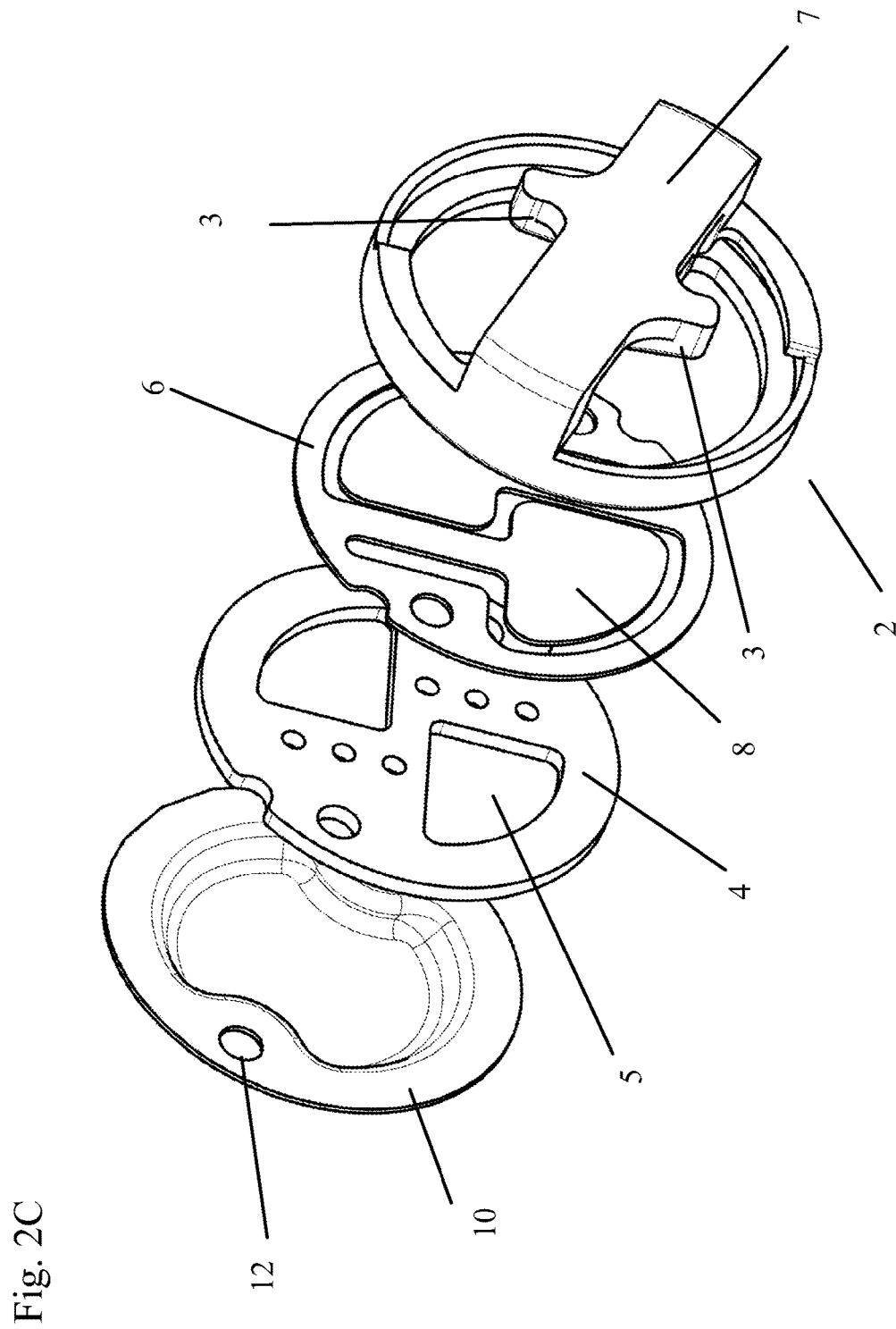
FIG. 2C shows another exploded view of the components of the double flapper valve in the first embodiment.
Figure 3A:
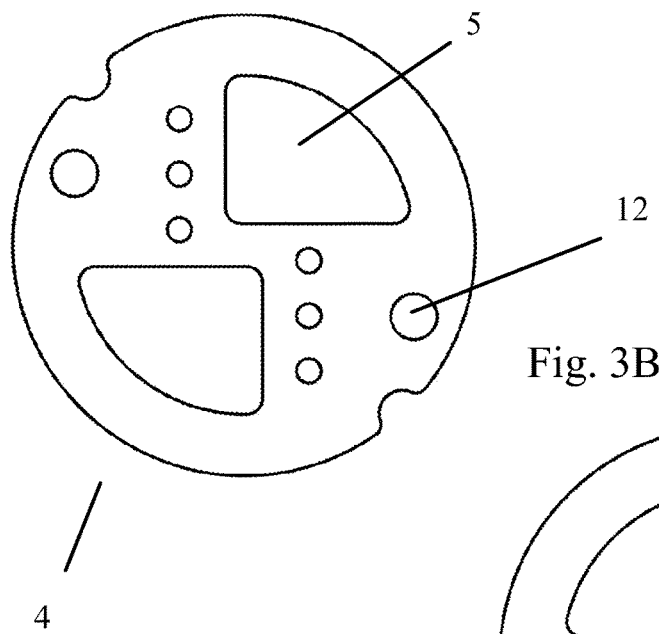
FIG. 3A shows a view of the seat of the double flapper valve, common to both the first, second and third embodiments described herein.
Figure 3B:
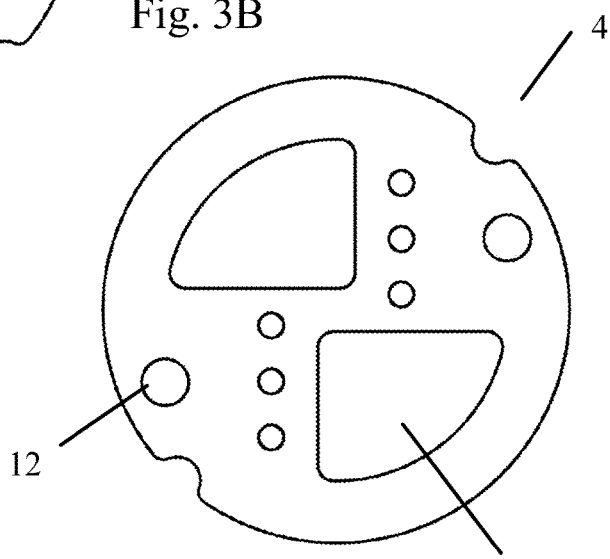
FIG. 3B shows another view of the seat of the double flapper valve.
Figure 3C:
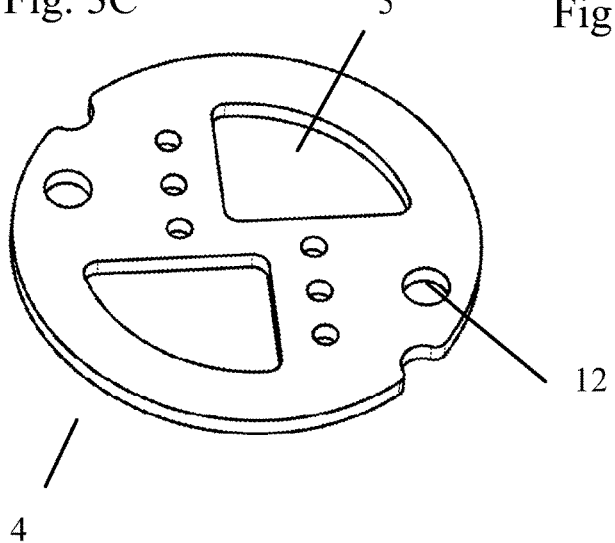
FIG. 3C shows a perspective view of the seat of the double flapper valve.
Figure 3D:
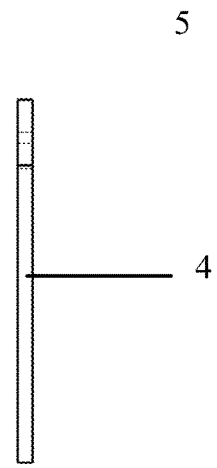
FIG. 3D shows a side view of the seat of the double flapper valve.

An isometric view of the valve assembly 18 is shown in FIGS. 1A and 1B. An exploded view of the components of the valve assembly 18 is shown in FIGS. 2A-2C.

The seat 4 of the valve assembly 18, shown in FIGS. 3A-3D, includes openings 5 shaped to fit the two flaps 8. This seat 4 is common to both the first, second and third embodiments described herein. The valve assembly 18 components 2, 4, 6, 10 each include holes 12 which can receive a mechanical means to hold the components 2, 4, 6, 10 together. During the molding process, these holes 12 can be closed, for example with the same material as the housing 2. The holes 12 in the housing 2 are located in protrusions 25 that are integrally formed and extend axially away from the lip 1.

Figure 4A:
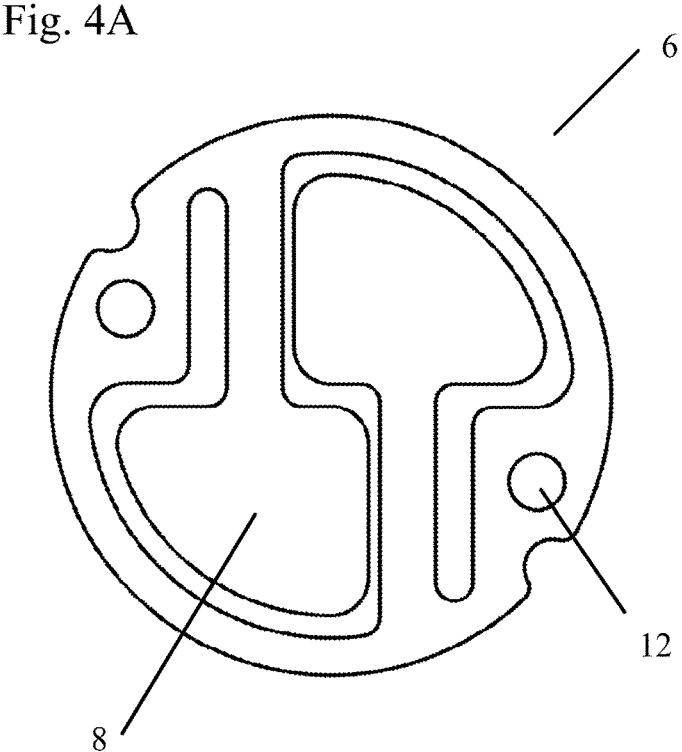
FIG. 4A shows a view of the double flapper valve, common to both the first, second and third embodiments described herein.
Figure 4C:
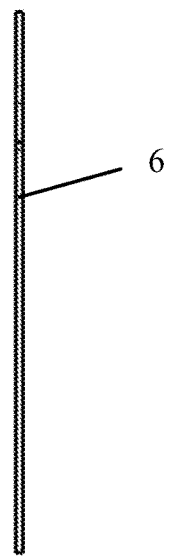
FIG. 4C shows a side view of the double flapper valve.
Figure 4B:
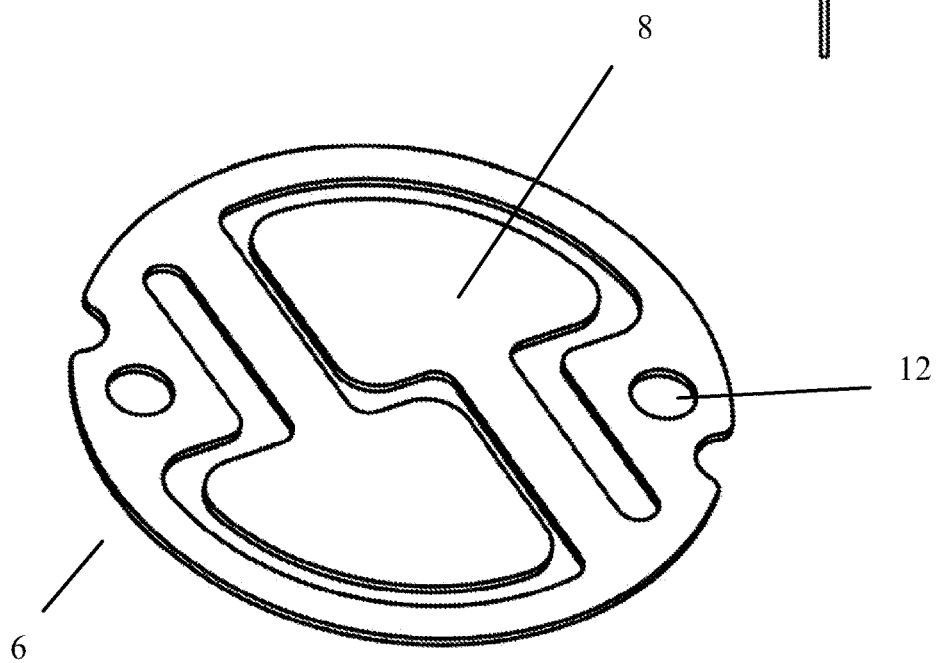
FIG. 4B shows a perspective view of the double flapper valve.
Figure 5A:
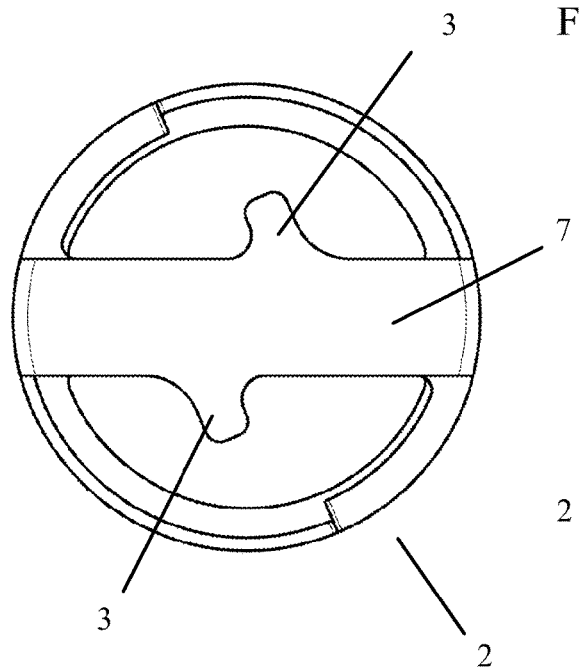
FIG. 5A shows a top view of a housing including the stoppers of the double flapper valve in the first embodiment.
Figure 5B:
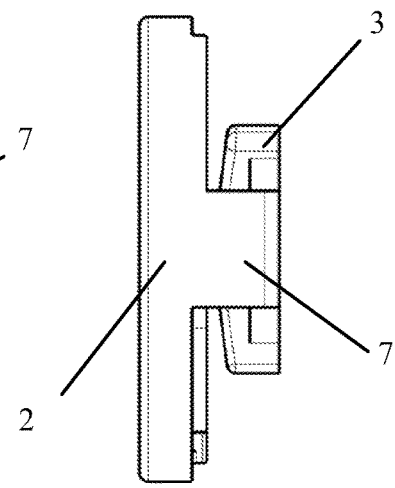
FIG. 5B shows a side view of a housing including the stoppers of the double flapper valve in the first embodiment.
Figure 5C:
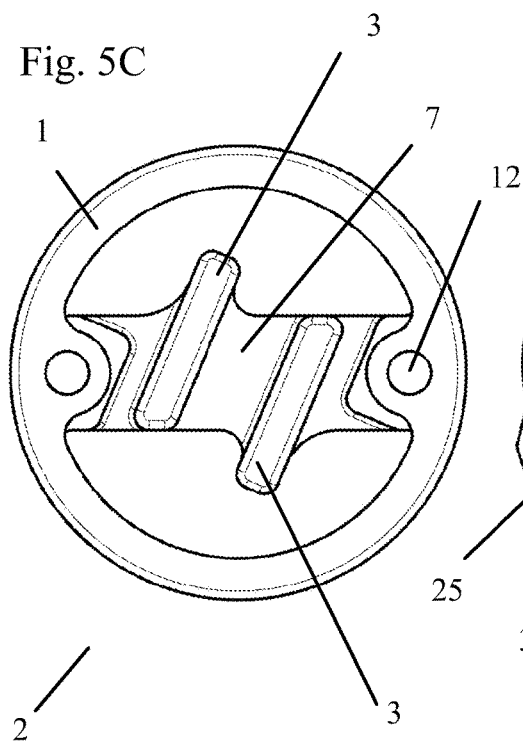
FIG. 5C shows a bottom view of a housing including the stoppers of the double flapper valve in the first embodiment.
Figure 5D:
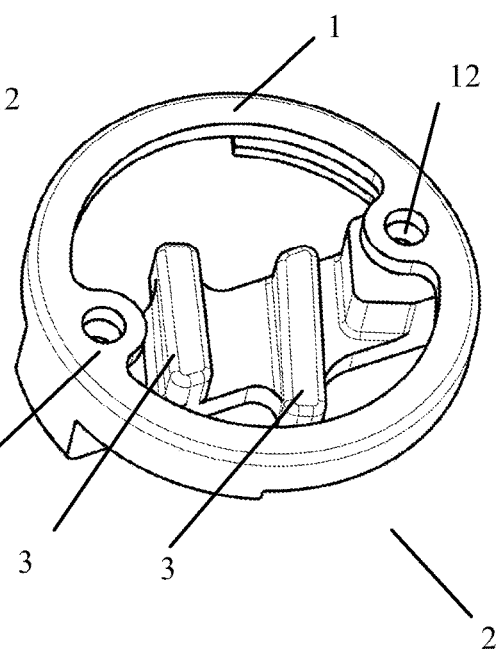
FIG. 5D shows a bottom perspective view of a housing including the stoppers of the double flapper valve in the first embodiment.
Figure 6A:
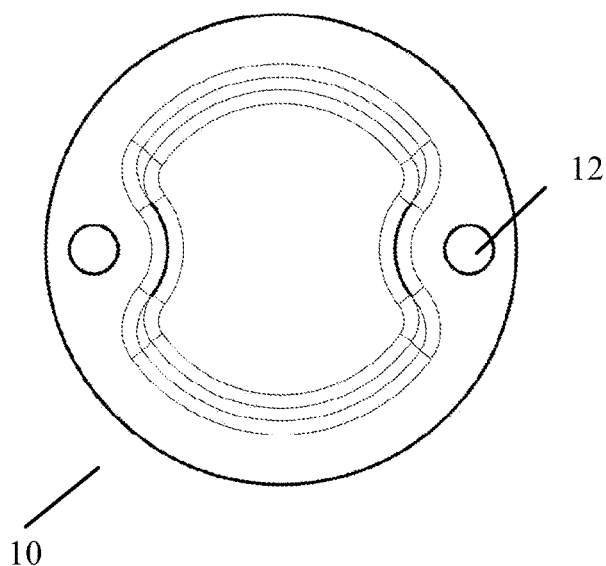
FIG. 6A shows a top view of a filter, common to the first and third embodiments. The mesh is not shown.
Figure 6B:
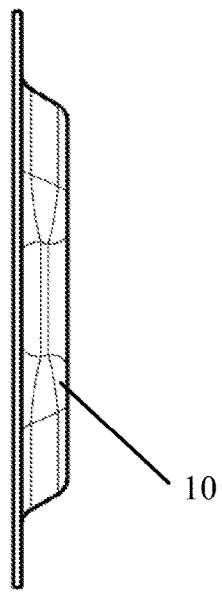
FIG. 6B shows a side view of the filter.
Figure 6C:
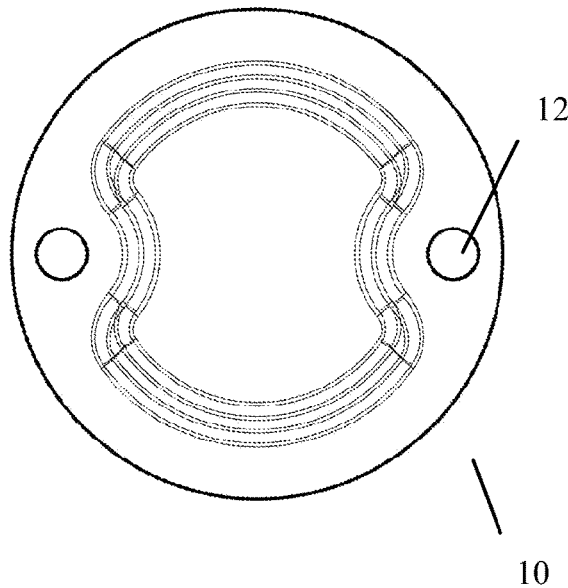
FIG. 6C shows a bottom view of the filter.
Figure 6D:
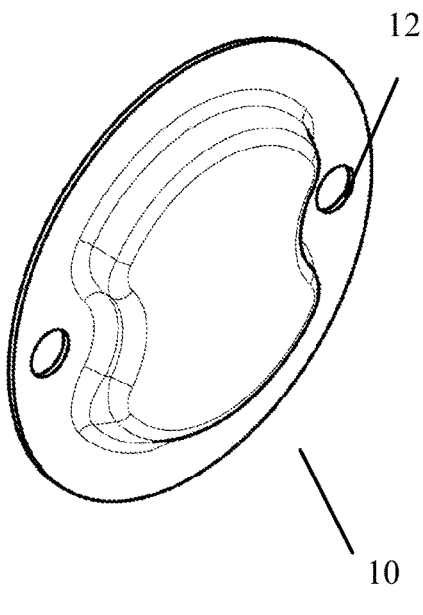
FIG. 6D shows a bottom perspective view of the filter.

The double flapper portion 6 of the valve assembly 18 is shown in FIGS. 4A-4C. There are dual flaps 8 in the double flapper portion 6, which permit high flow passage through the valve 18. The double flapper portion 6 is common to both the first, second and third embodiments.

FIGS. 5A-5D show the valve housing 2, which is preferably overmolded and made of plastic. The housing 2 includes a lip 1 and a body 7 that forms stoppers 3 for the dual flaps 8. The stoppers 3 limit the stroke of the two flaps 8 of the double flapper portion 6, to keep the double flapper portion 6 from opening too far and/or to improve the dynamic response.

FIGS. 6A-6D shows the filter 10. The mesh for the filter 10 is not shown in the figures.

In some preferred embodiments, the housing 2 is made of plastic, or plastic and fiber glass (e.g.—50% fiberglass). In some preferred embodiments, the double flapper valve 6 and/or the filter 10 are made of steel. In some preferred embodiments, the valve seat 4 is made of steel.

Figure 7:
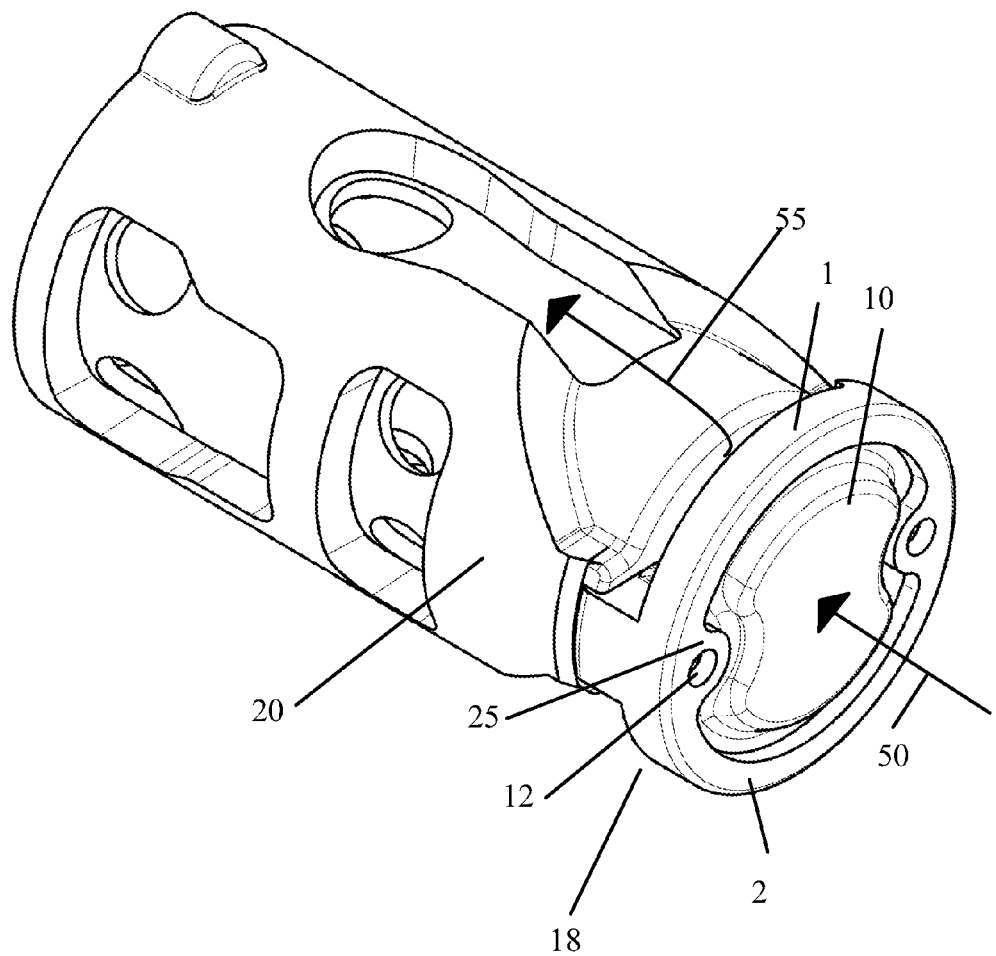
FIG. 7 shows a view of the double flapper valve assembled on the sleeve in the first embodiment.
Figure 8:
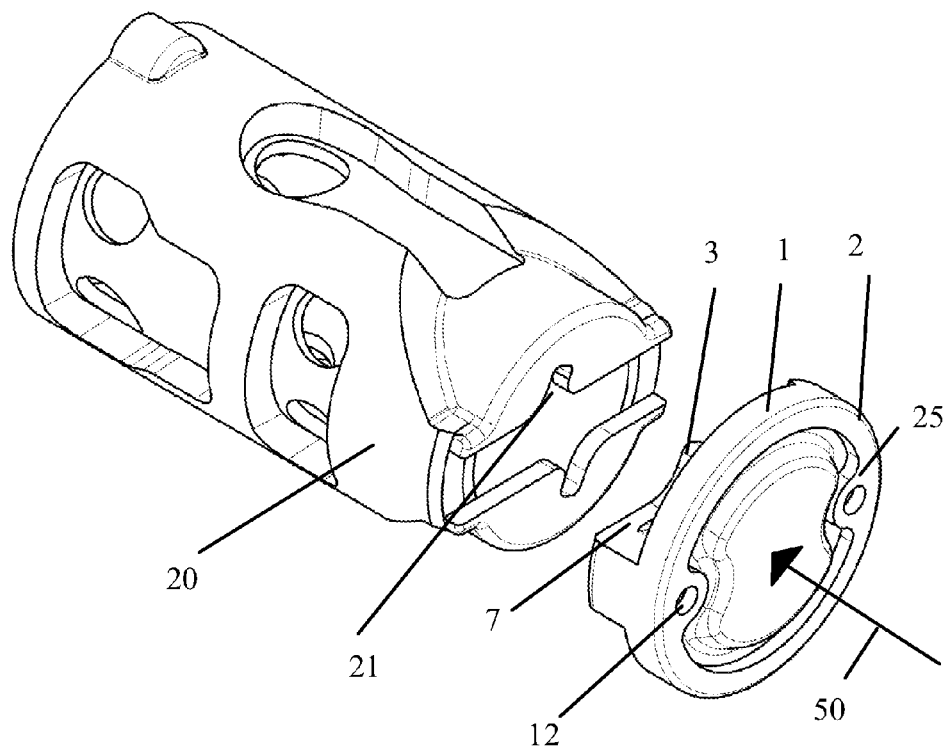
FIG. 8 shows an exploded view of the double flapper valve assembled on the sleeve in the first embodiment.

FIG. 7 shows a view of the valve assembled on a sleeve 20 and FIG. 8 shows an exploded view of the valve assembled on the sleeve 20. The sleeve 20, also known as a sleeve-overmold, is preferably manufactured using an overmolding process. The sleeve 20 is preferably made of steel. The top portion of the sleeve 20 is shaped with grooves 21 to receive the stoppers 3 of the housing 2. Arrow 50 in FIGS. 7 and 8 shows oil entering the check valve assembly 18 (preferably coming from the camshaft nose) through the filter 10. Arrow 55 in FIG. 7 shows the oil coming from the double flapper valve to a common passage of the overmold 20.

Figure 9:
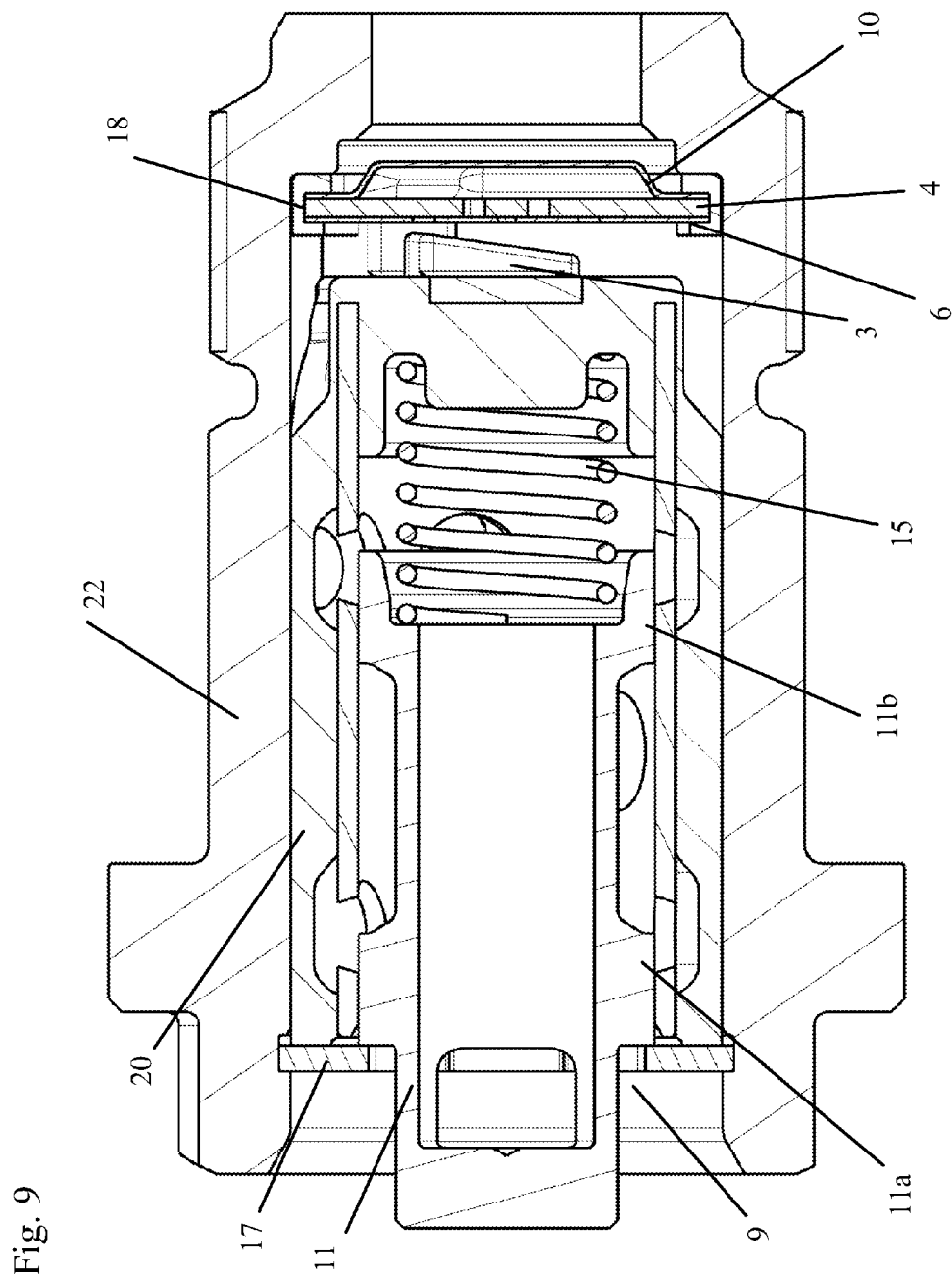
FIG. 9 shows a section of the valve and sleeve assembled in a center bolt body in the first embodiment.

FIG. 9 shows a section of the valve assembly 18 and sleeve 20 assembled in a center bolt 22 of a variable cam timing phaser. A control valve 9, which is preferably a spool valve, is placed inside the center bolt 22 of a rotor. The control valve 9 includes a spool 11 with cylindrical lands 11a, 11b slidably received in the sleeve 20. One end of the spool 11 contacts a spring 15. The movement of the spool 11 is limited by a plate 17. As shown in the figure, the spool 11 is in the left most position, and further travel to the left is limited by the interaction of the spool land 11a with the plate 17. The check valve assembly 18 permits entry of oil into the phaser through the double flapper portion 6. The stoppers 3 limit the extension of the flaps 8 to limit the amount of oil entering the phaser.

The center bolt 22 shown in FIG. 9 is for a TA phaser. In contrast, a CTA phaser has three cylindrical lands such that the shape and numbers of holes/passages in the sleeve 20 would be different. However, the double flapper valve assembly 18 described in the first embodiment would otherwise be the same for a CTA phaser.

FIGS. 3A-3D, 4A-4C and 10A-17 show another embodiment of a double flapper valve assembly 38. The double flapper valve assembly 38 opens the oil inlet passage created on a valve seat 4 and the stroke of the valve assembly 38 is stopped when the flaps 8 hits a stopper 33.

Figure 10A:
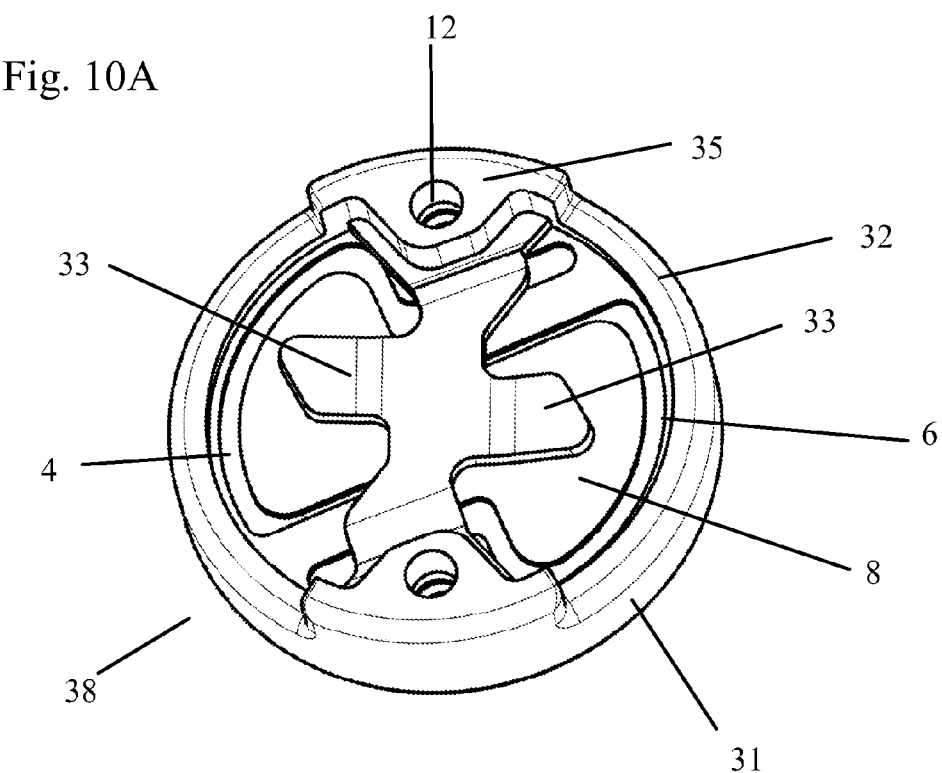
FIG. 10A shows a bottom isometric view of a second embodiment of the double flapper valve assembly.
Figure 10B:
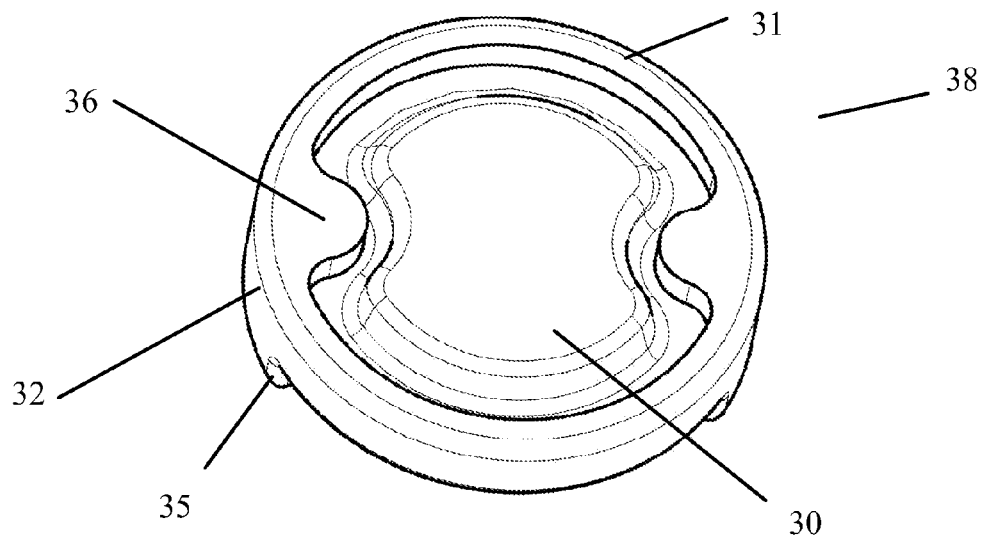
FIG. 10B shows a top isometric view of a second embodiment of the double flapper valve assembly.

An isometric view of the valve assembly 38 is shown in FIGS. 10A and 10B. The valve assembly 38 includes a housing 32, a double flapper valve portion 6 with two flaps 8, a seat 4 (shown in FIGS. 11A and 11B), a stopper piece 37 and a filter 30. The housing 32 includes a lip 31 that surrounds the other double flapper check valve assembly components.

Figure 11A:
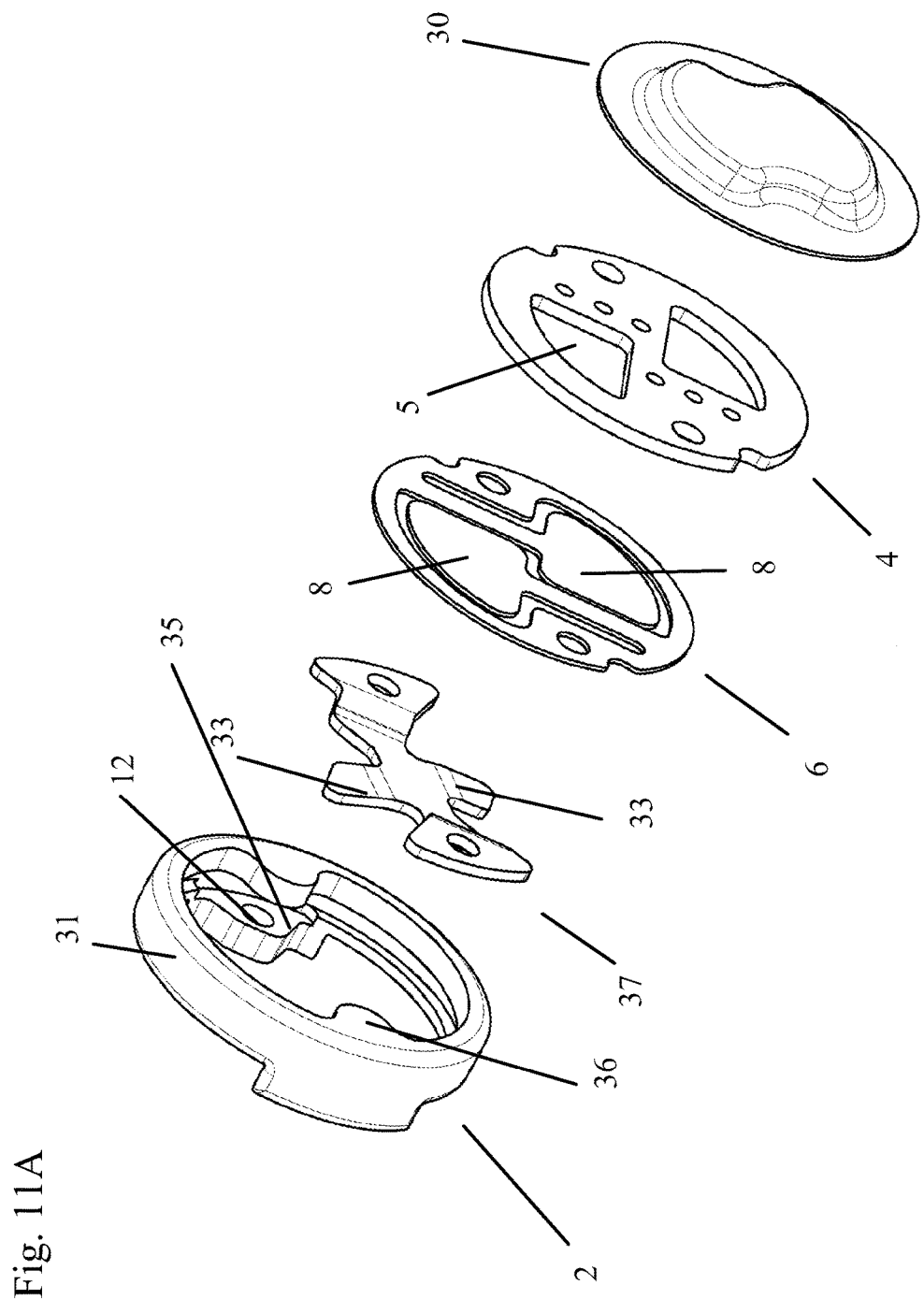
FIG. 11A shows an exploded view of the components of the double flapper valve in the second embodiment.
Figure 11B:
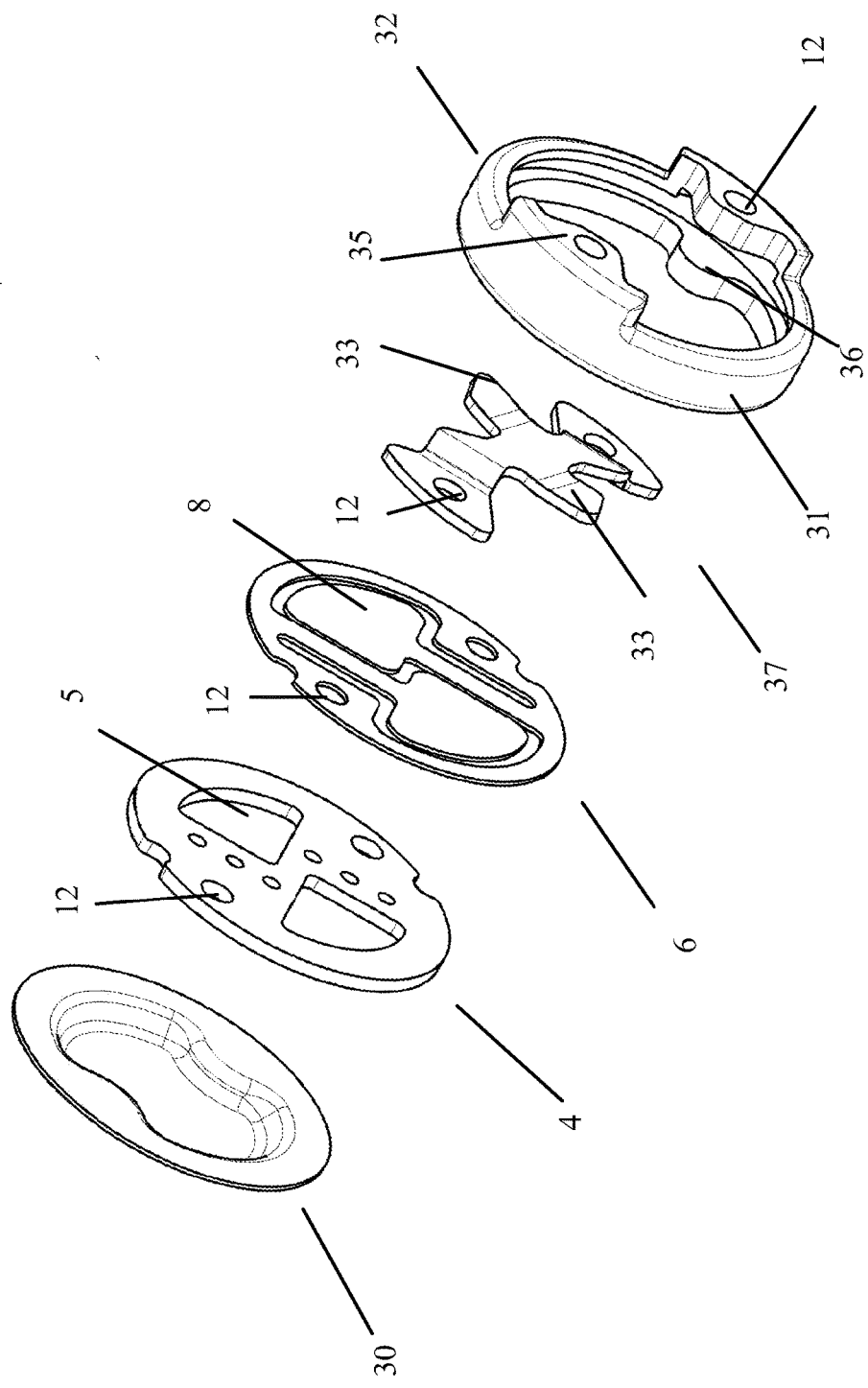
FIG. 11B shows another exploded view of the components of the double flapper valve in the second embodiment.
Figure 12A:
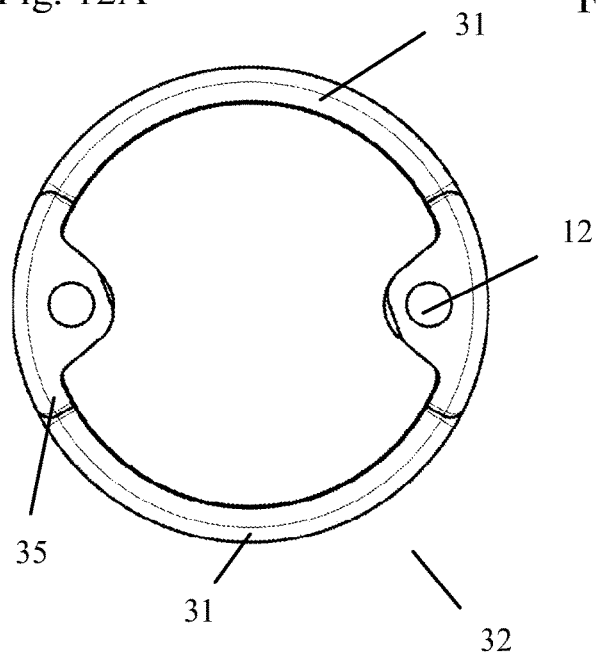
FIG. 12A shows a top view of the housing in the second embodiment.
Figure 12B:
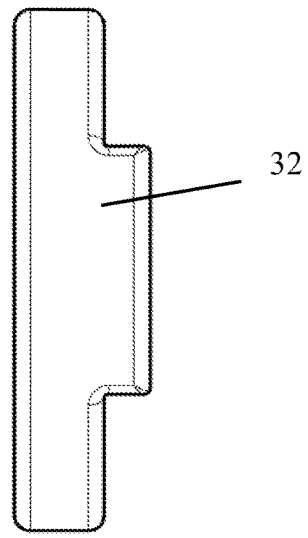
FIG. 12B shows a side view of the housing in the second embodiment.
Figure 12C:
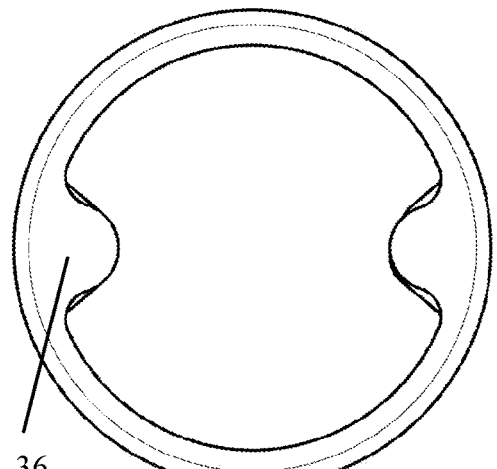
FIG. 12C shows a bottom view of the housing in the second embodiment.
Figure 12D:
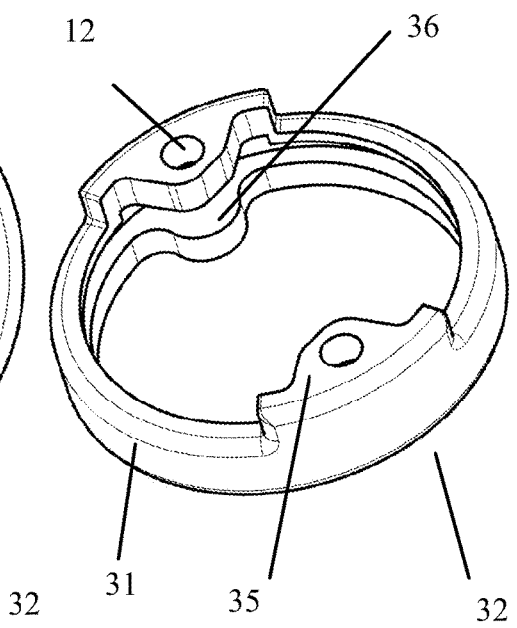
FIG. 12D shows a top perspective view of the housing in the second embodiment.
Figures 14A, 14B:
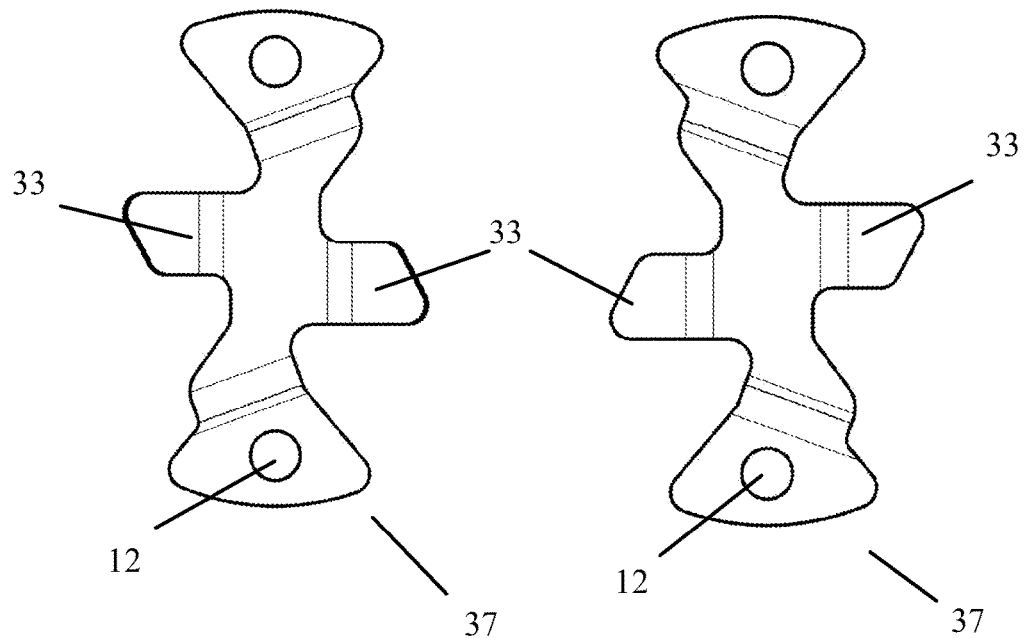
FIG. 14A shows a view of a stopper piece in the second embodiment.
FIG. 14B shows another view of a stopper piece in the second embodiment.
Figures 14C, 14D:
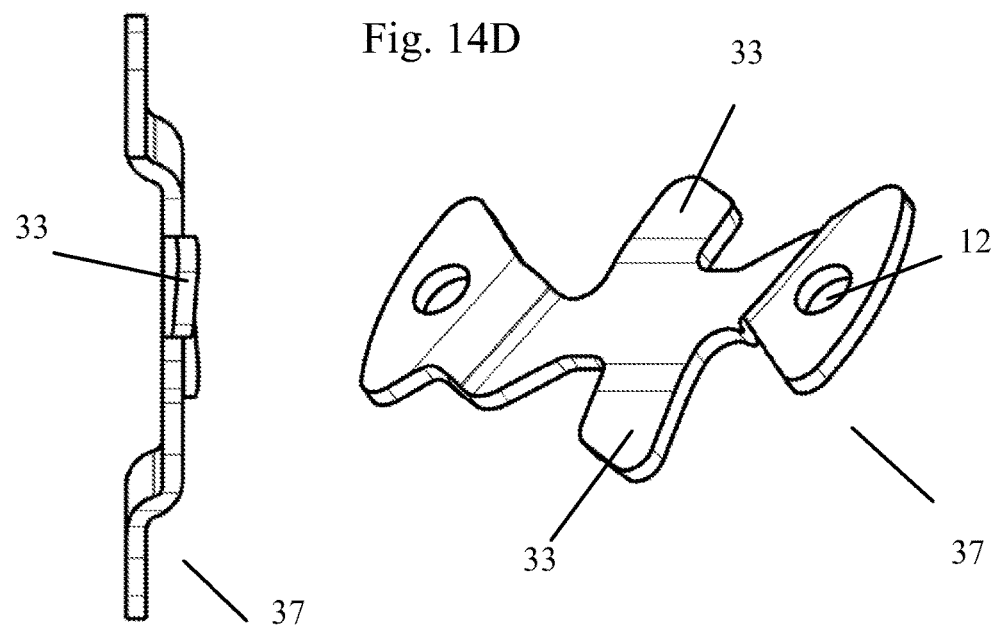
FIG. 14C shows a side view of a stopper piece in the second embodiment.
FIG. 14D shows a perspective view of a stopper piece in the second embodiment.

The valve assembly 38 components 32, 4, 6, 37 each include holes 12 (not shown) which are aligned and receive a mechanical means to hold the components 32, 4, 6, 37 together. During the molding process, these holes 12 can be closed, for example with the same material as the housing 32. The holes 12 in the housing 32 are located in protrusions 35 that extend from the lip 31. A second pair of protrusions 36 extend axially from the opposite side of the lip 31 and hold in the check valve components. The stoppers 33 have a shape that limits the extension of the dual flaps 8. An exploded view of these components of the valve assembly 38 is shown in FIGS. 11A-11C.

The seat 4 for the double flapper portion 6 is common to the first, second and third embodiments, are shown in FIGS. 3 and 4. The double flapper portion 6 of the valve 38 includes dual flaps 8, which permits high flow passage through the valve assembly 38. The seat 4 for the valve includes openings 5 shaped to fit the two flaps 8.

FIGS. 12A-12D show the valve housing 32, which is preferably overmolded and made of plastic. FIGS. 13A-13C show the filter 30. The filter 30 differs from the filter 10 in that it does not have any holes 12. The mesh for the filter 30 is not shown in the figures and the openings of the mesh may be any size.

The stoppers 33 for the dual flaps 8 are shown in FIGS. 14A-14D. The stoppers 33 in this embodiment make up a separate stopper piece 37 and are shaped differently than the stoppers 3 in FIGS. 1-9. The stoppers 33 limit the stroke of the two flaps 8 of the double flapper portion 6, to keep the double flapper portion 6 from opening too far and/or to improve the dynamic response.

In some preferred embodiments, the housing 32 is made of plastic, or plastic and fiber glass (e.g.—50% fiberglass). In some preferred embodiments, the double flapper portion 6 and/or the filter 30 are made of steel. In some preferred embodiments, the valve seat 4 is made of steel. In some preferred embodiments, the stopper piece 37 with the stoppers 33 is made of steel.

Figure 15:
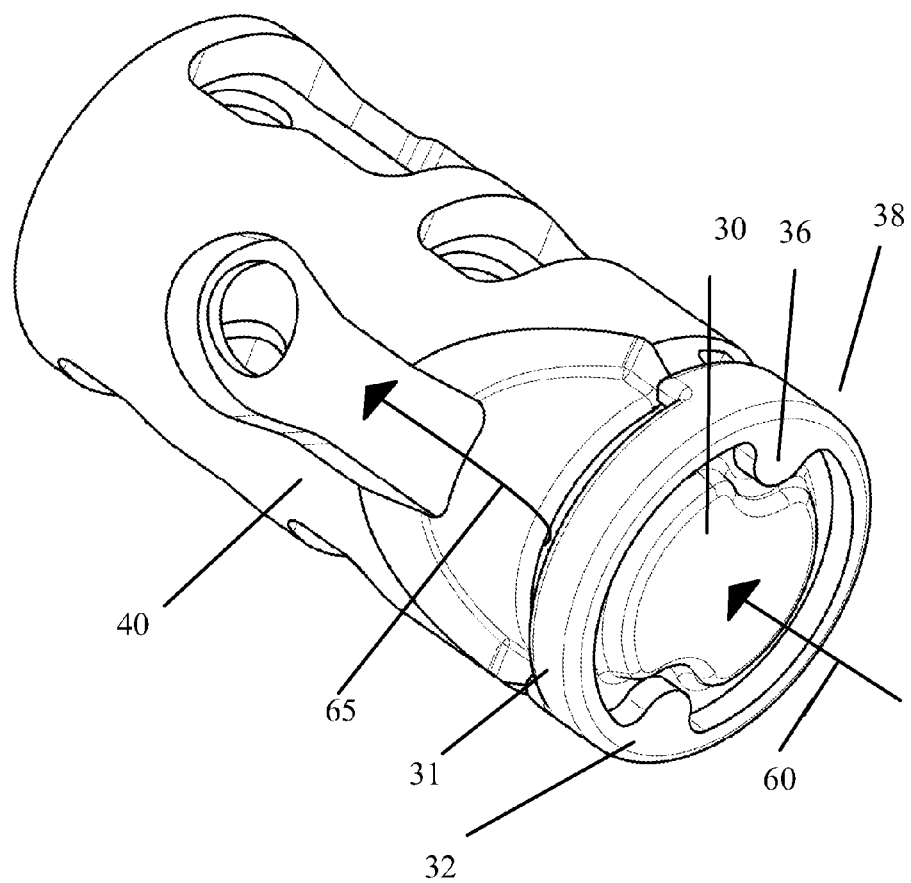
FIG. 15 shows a view of the valve assembled on the sleeve in the second embodiment.
Figure 16:
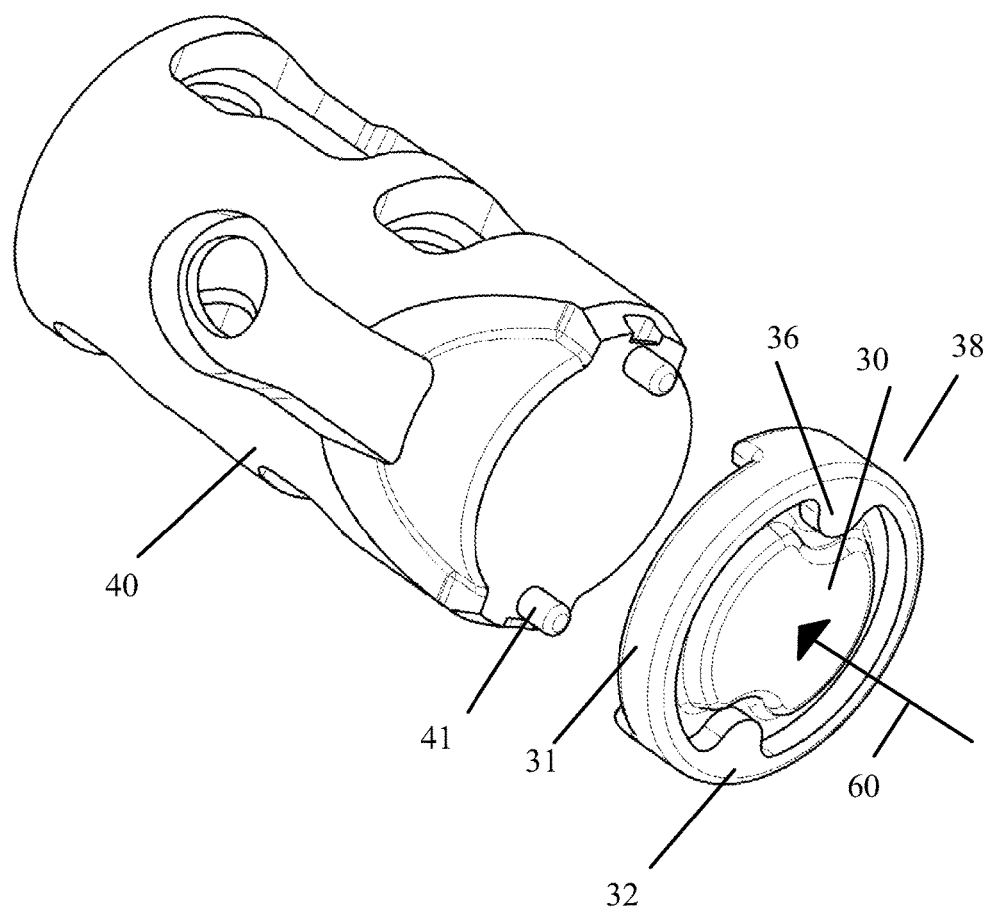
FIG. 16 shows an exploded view of the valve assembled on the sleeve in the second embodiment.

FIG. 15 shows a view of the valve assembled on a sleeve 40. FIG. 16 shows an exploded view of the valve assembled on the sleeve 40. The sleeve 40, also known as a sleeve-overmold, is preferably manufactured using an overmolding process. The sleeve 40 is preferably made of steel. The sleeve 40 includes protrusions 41 to receive the holes 12 in the double flapper valve assembly 38. Arrow 60 in FIGS. 15 and 16 shows oil entering the valve assembly 38 (preferably coming from the camshaft nose) through the filter 30. Arrow 65 in FIG. 15 shows the oil coming from the double flapper valve to a common passage of the sleeve 40.

Figure 17:
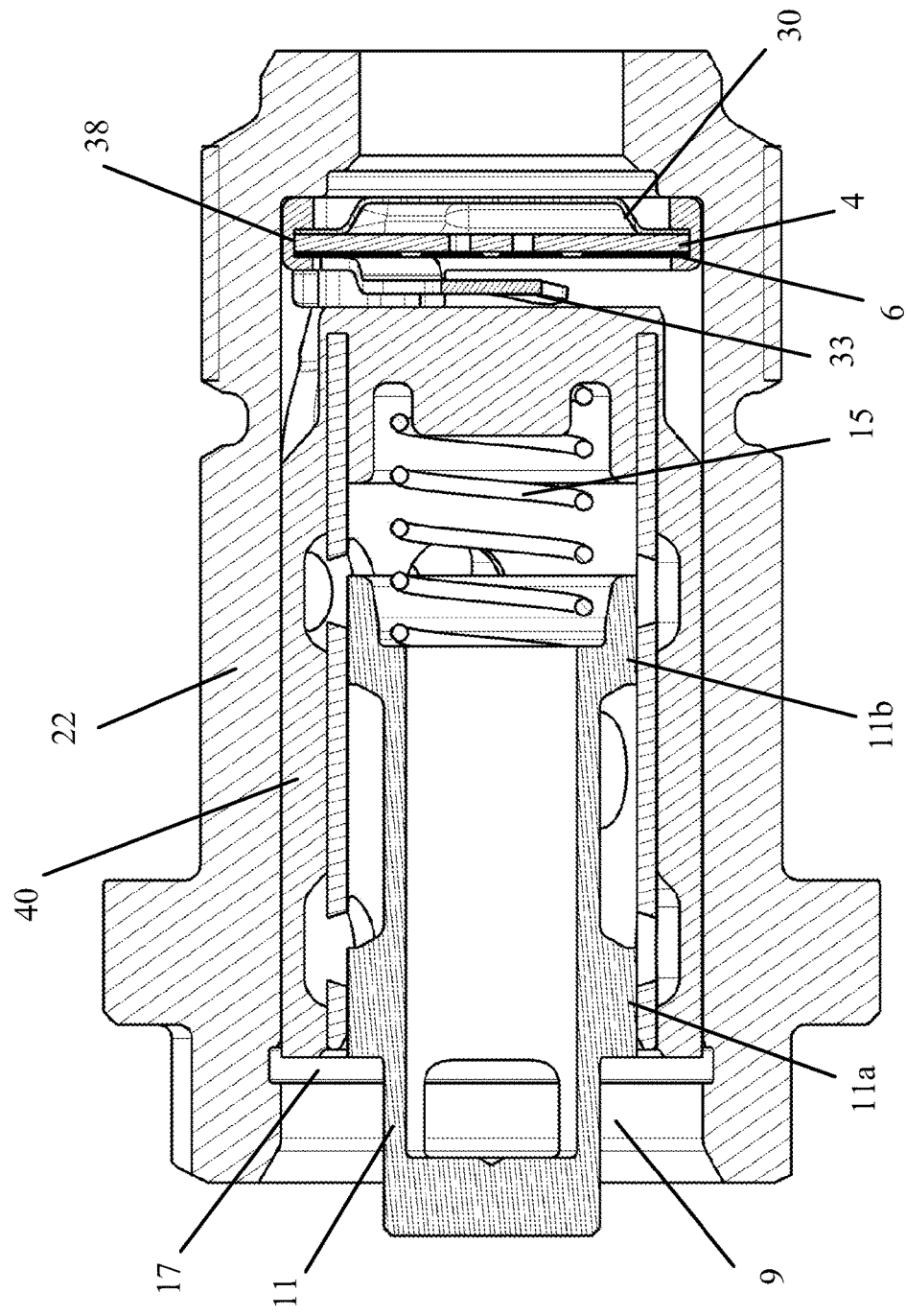
FIG. 17 shows a section of the valve and sleeve assembled in a center bolt body in the second embodiment.

FIG. 17 shows a section of the valve assembly 38 and sleeve 40 assembled in a center bolt 22 of a variable cam timing phaser. A control valve 9, which is preferably a spool valve, is placed inside the center bolt 22 of a rotor. The control valve 9 includes a spool 11 with cylindrical lands 11a, 11b slidably received in the sleeve 40. One end of the spool 11 contacts a spring 15. The movement of the spool 11 is limited by a plate 17. As shown in the figure, the spool 11 is in the left most position, and further travel to the left is limited by the interaction of the spool land 11a with the plate 17. The valve assembly 38 permits entry of oil into the phaser through the double flapper portion 6. The stoppers 33 limit the extension of the flaps 8 to limit the amount of oil entering the control valve 9 of the phaser.

The center bolt 22 shown in FIG. 17 is for a TA phaser. In contrast, a CTA phaser has three cylindrical lands such that the shape and numbers of holes/passages in the sleeve 40 would be different. However, the double flapper valve assembly 38 described in the second embodiment would otherwise be the same for a CTA phaser.

A third embodiment of a double flapper valve assembly 78 is shown in FIGS. 3, 4, 6, and 20-25. The double flapper valve portion 8 opens the oil inlet passage created on a valve seat 4 and the stroke of the valve assembly 78 is stopped when the dual flips 8 hit a stopper 73.

Figure 20A:
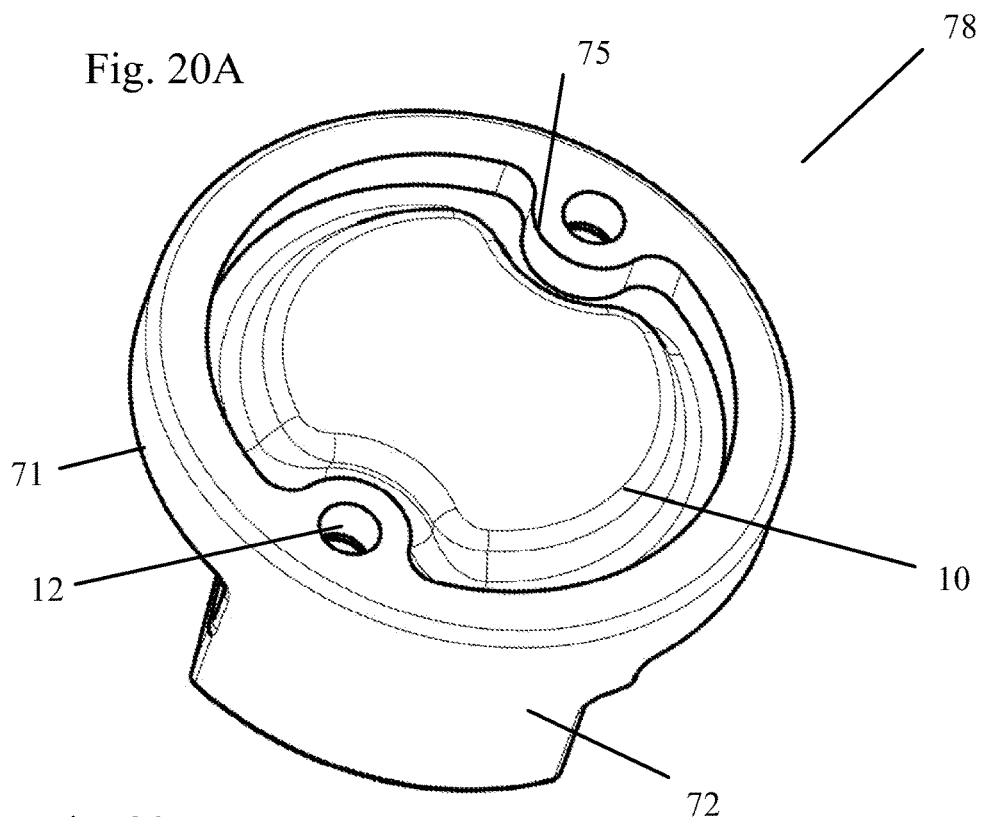
FIG. 20A shows a top isometric view of a third embodiment of the double flapper valve assembly.
Figure 20B:
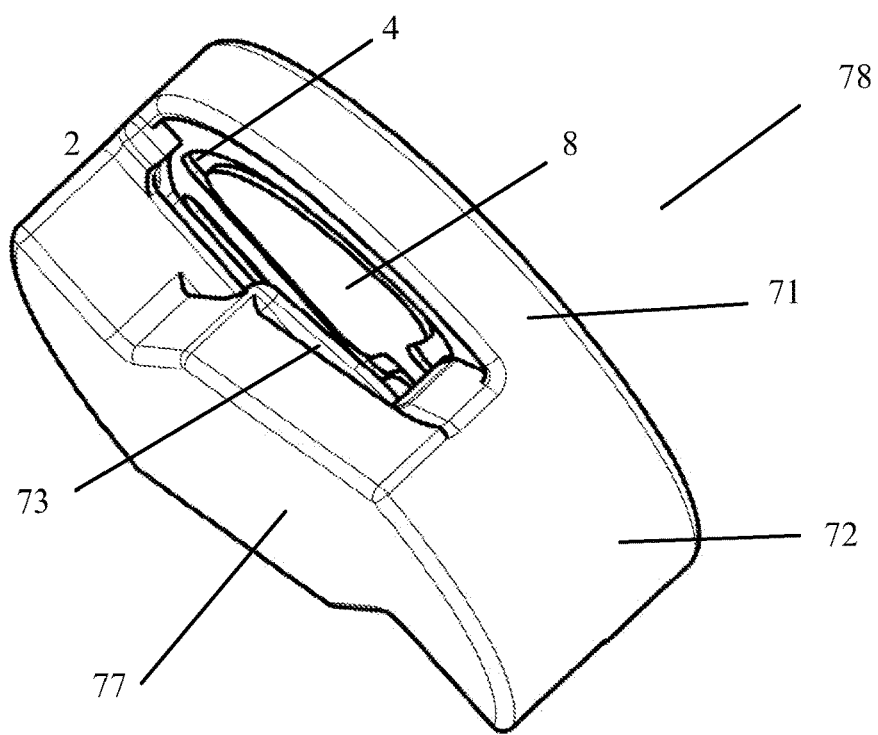
FIG. 20B shows a side isometric view of the third embodiment of the double flapper valve.
Figure 20C:
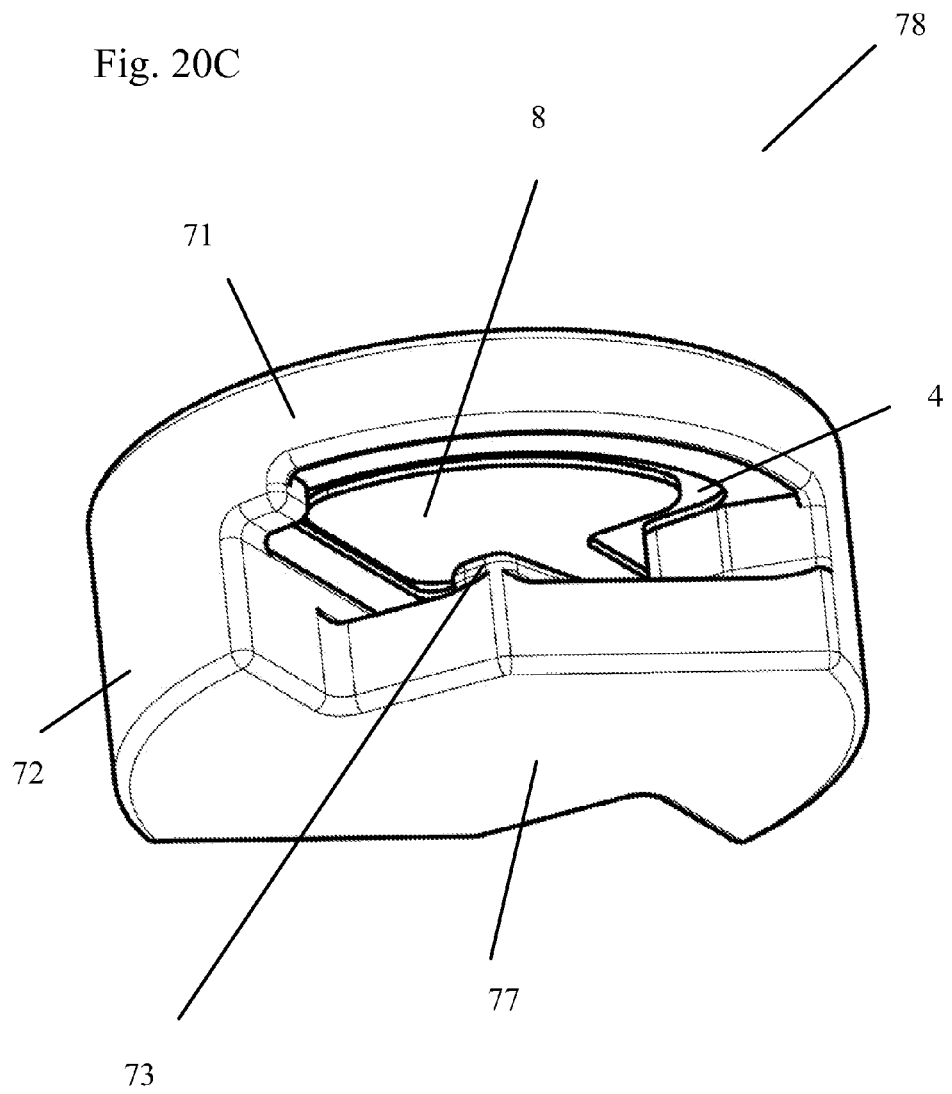
FIG. 20C shows another side isometric view of the third embodiment of the double flapper valve.
Figure 21A:
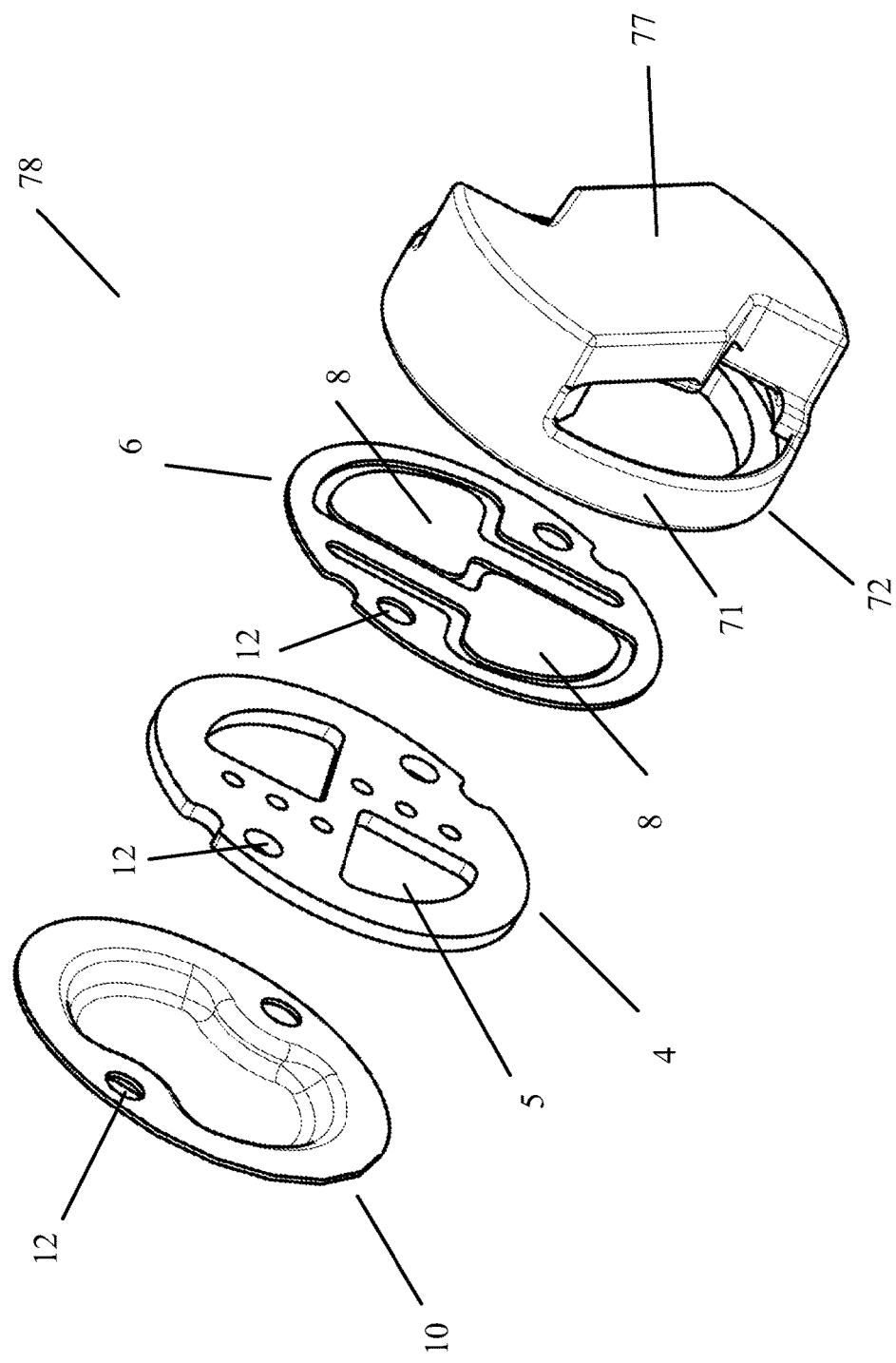
FIG. 21A shows an exploded view of the components of the double flapper valve in the third embodiment.
Figure 21B:
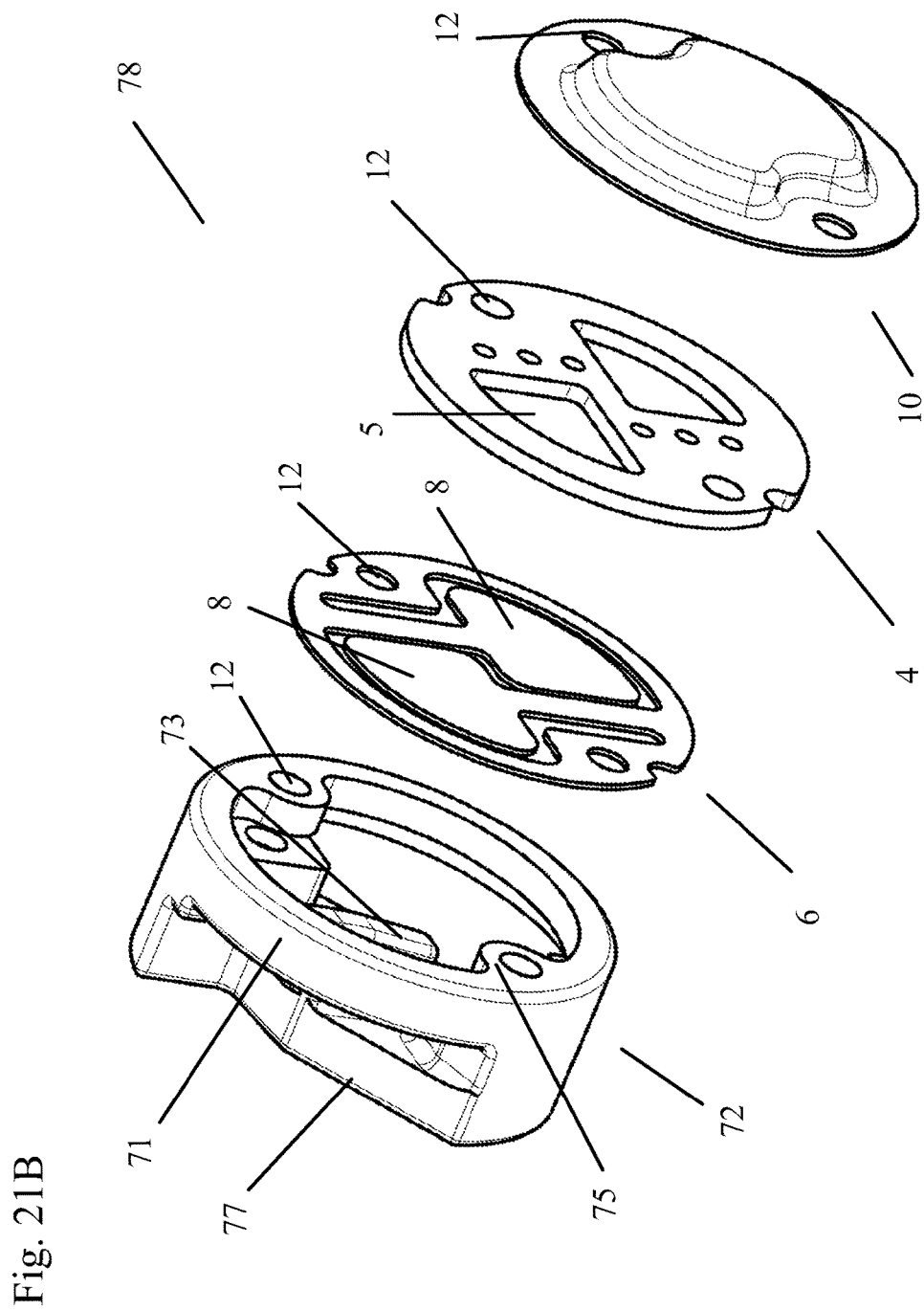
FIG. 21B shows another exploded view of the components of the double flapper valve in the third embodiment.
Figure 22A:
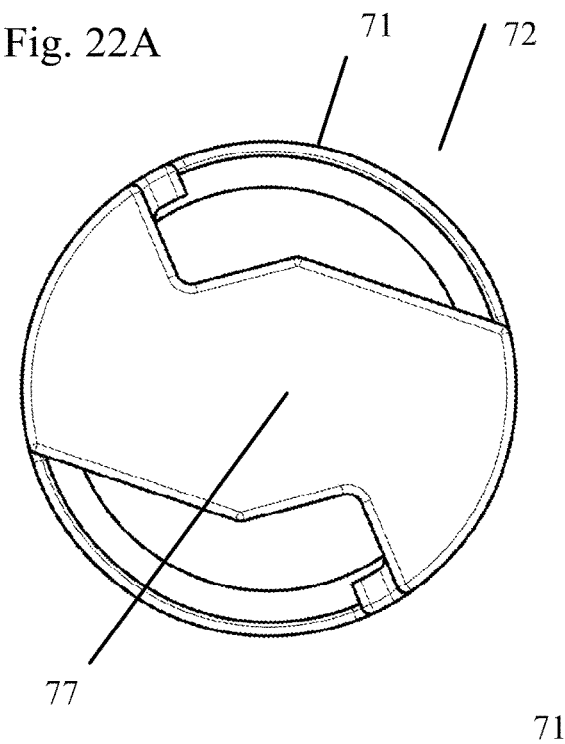
FIG. 22A shows a top view of a housing including the stoppers of the double flapper valve in the third embodiment.
Figure 22B:
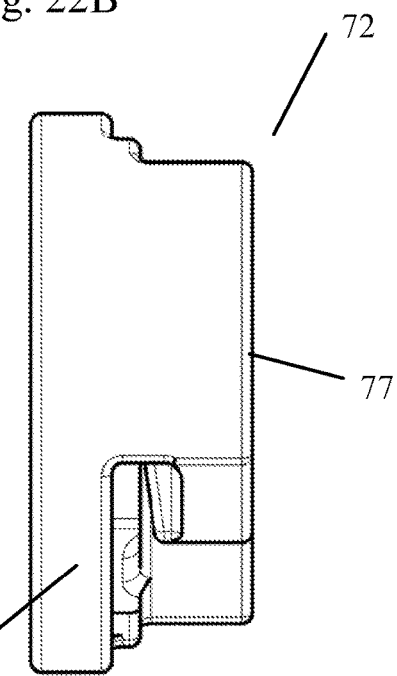
FIG. 22B shows a side view of a housing including the stoppers of the double flapper valve in the third embodiment.
Figure 22C:
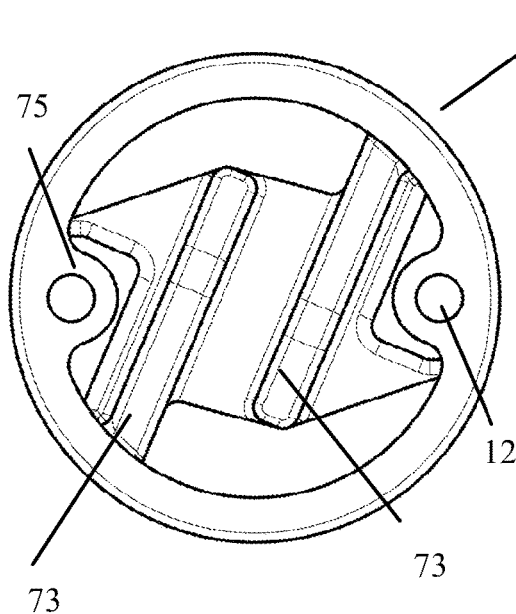
FIG. 22C shows an interior bottom view of a housing including the stoppers of the double flapper valve in the third embodiment.
Figure 22D:
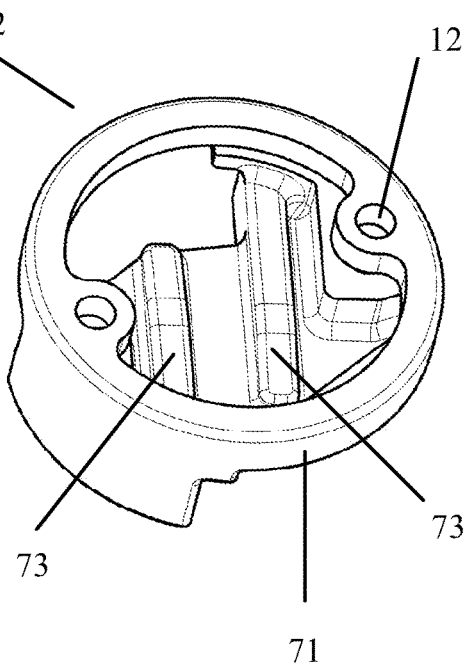
FIG. 22D shows a perspective view of a housing including the stoppers of the double flapper valve in the third embodiment.

An isometric view of the valve assembly 78 is shown in FIGS. 20A through 20C. The valve assembly 78 includes a housing 72, a double flapper valve portion 6 with two flaps 8, a seat 4 (shown in FIGS. 21A and 21B) and an optional filter 10. The housing 72 includes a body 77 that forms two stoppers 73 that limit the dual flaps 8. The housing 72 also includes a lip 71 that surrounds the other double flapper check valve assembly components. An exploded view of these components of the valve assembly 78 is shown in FIGS. 21A and 21B.

The seat 4 for the double flapper portion 6 is common to the first, second and third embodiments, are shown in FIGS. 3 and 4. The double flapper portion 6 of the valve assembly 78 includes dual flaps 8, which permits high flow passage of fluid through the valve 78. The seat 4 for the valve includes openings 5 shaped to fit the two flaps 8. The valve assembly 78 components 72, 4, 6, 10 each include holes 12 which are aligned to receive a mechanical means to connect and hold the components 72, 4, 6, 10 together. During the molding process, these holes 12 can be closed, for example with the same material as the housing 72. The holes 12 in the housing 72 are located in protrusions 75 that extend inward away from the lip 71.

FIGS. 22A-22D show the housing 72, which is preferably overmolded and made of plastic. The housing 72 includes a lip 71 and a body 77 that forms the stoppers 73 for the dual flaps 8. The stoppers 73 limit the stroke of the two flaps 8 of the double flapper portion 6, to keep the flaps 8 of the double flapper portion 6 from opening too far and/or to improve the dynamic response. The shape of the stoppers 73 differ from the shape of the stoppers 3 that are part of the housing 2 in FIGS. 1-9. FIGS. 6A-6D shows the filter 10, which is the same as the filter in the first embodiment. The mesh for the filter 10 is not shown in the figures.

In some preferred embodiments, the housing 72 is made of plastic, or plastic and fiber glass (e.g.—50% fiberglass). In some preferred embodiments, the double flapper valve portion 6 and/or the filter 10 are made of steel. In some preferred embodiments, the valve seat 4 is made of steel.

Figure 23:
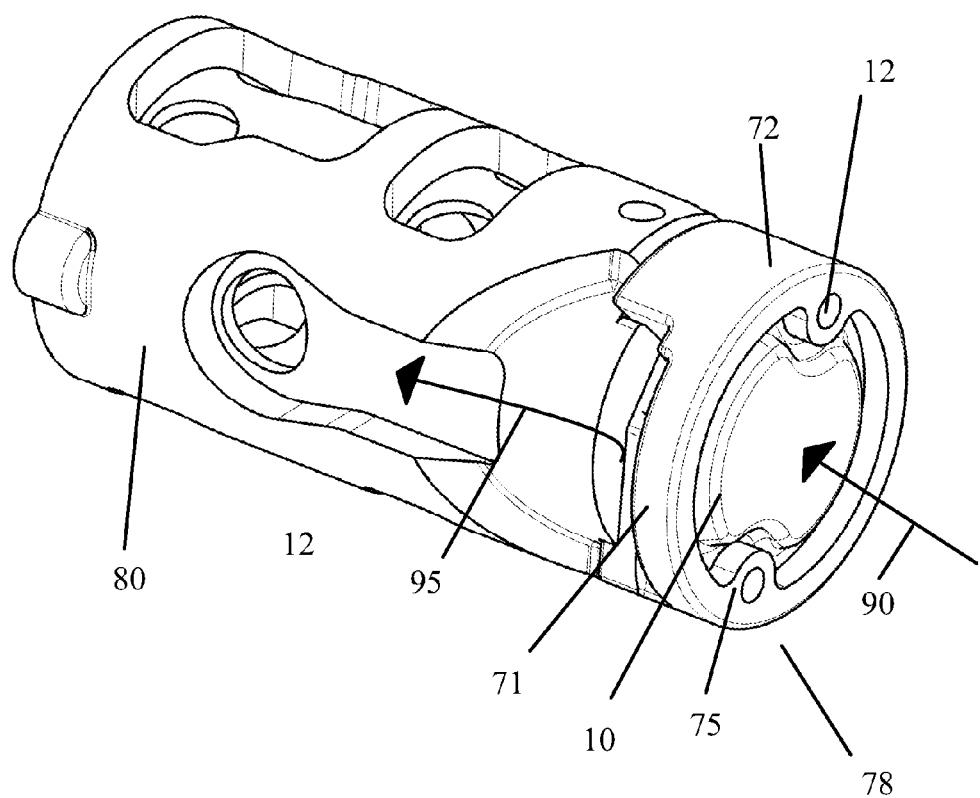
FIG. 23 shows a view of the double flapper valve assembled on the sleeve in the third embodiment.
Figure 24:
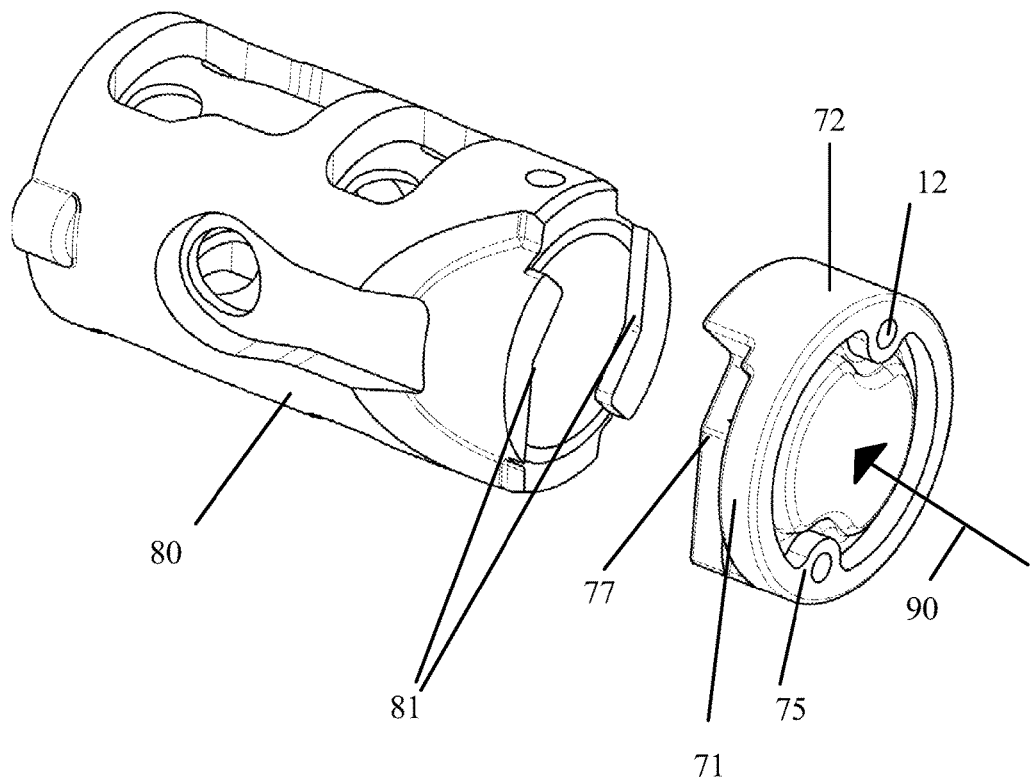
FIG. 24 shows an exploded view of the double flapper valve assembled on the sleeve in the third embodiment.

FIG. 23 shows a view of the valve assembled on a sleeve 80 and FIG. 24 shows an exploded view of the valve assembled on the sleeve 80. The sleeve 80, also known as a sleeve-overmold, is preferably manufactured using an over-molding process. The sleeve 80 is preferably made of steel. The top portion of the sleeve 80 has a shape 81 to receive the stoppers 73 of the housing 72. Arrow 90 in FIGS. 23 and 24 shows oil entering the check valve assembly 78 (preferably coming from the camshaft nose) through the filter 10. Arrow 95 in FIG. 23 shows the oil coming from the double flapper valve to a common passage of the overmold 80.

Figure 25:
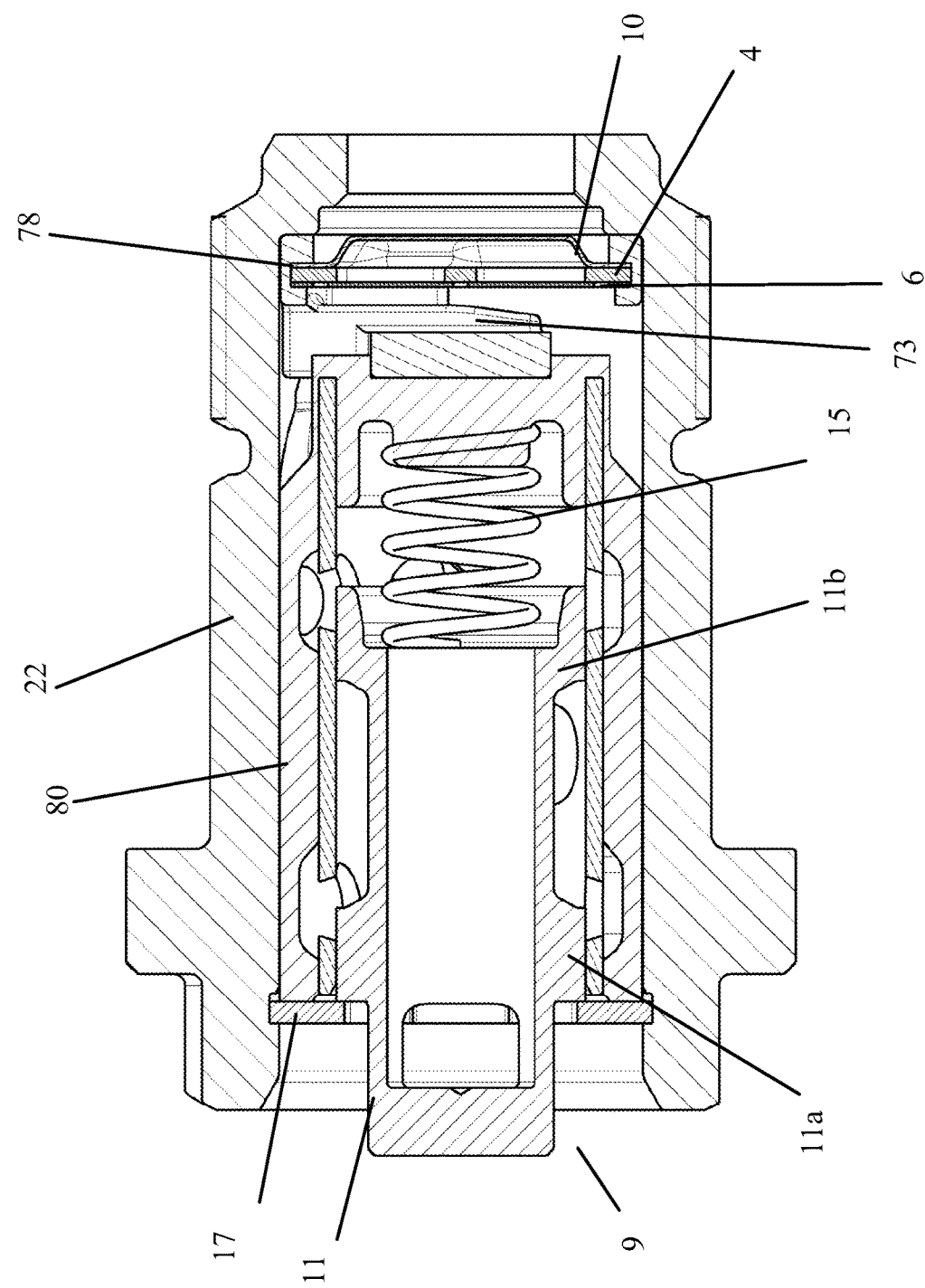
FIG. 25 shows a section of the valve and sleeve assembled in a center bolt body in the third embodiment.

FIG. 25 shows a section of the valve 78 and sleeve 80 assembled in a center bolt 22 of a variable cam timing phaser. A control valve 9, which is preferably a spool valve, is placed inside the center bolt 22 of a rotor. The control valve 9 includes a spool 11 with cylindrical lands 11a, 11b slidably received in the sleeve 80. One end of the spool 11 contacts a spring 15. The movement of the spool 11 is limited by a plate 17. As shown in the figure, the spool 11 is in the left most position, and further travel to the left is limited by the interaction of between the spool land 11a and the plate 17. The check valve assembly 78 permits entry of oil into the phaser through the double flapper portion 6. The stoppers 73 limit the extension of the flaps 78 to limit the amount of oil entering the phaser.

The center bolt 22 shown in FIG. 25 is for a TA phaser. In contrast, a CTA phaser has three cylindrical lands such that the shape and numbers of holes/passages in the sleeve 80 would be different. However, the double flapper valve assembly 78 described in the first embodiment would otherwise be the same for a CTA phaser.

Figure 18A:
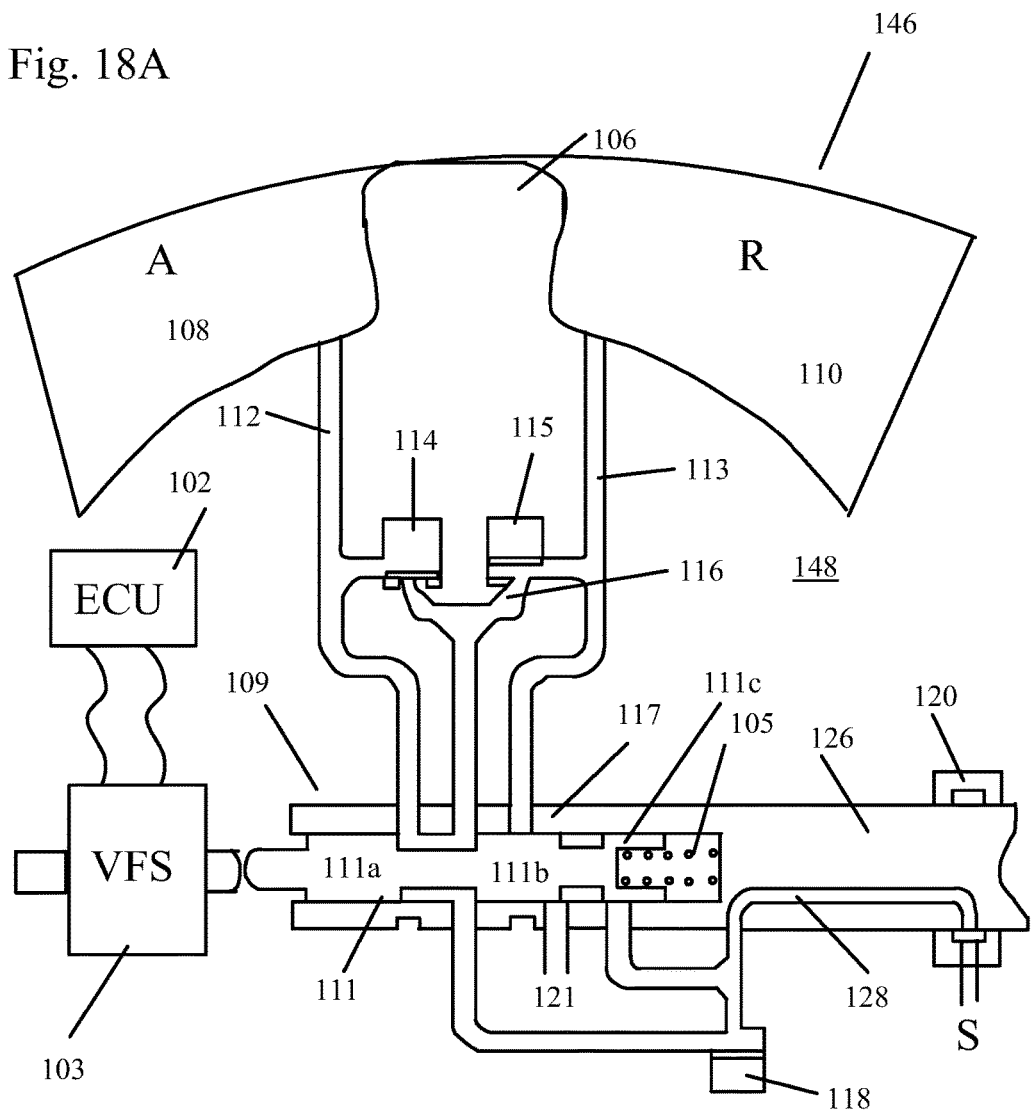
FIG. 18A shows a schematic of a cam torque actuated (CTA) phaser with a double flapper valve shifting towards retard.
Figure 18B:
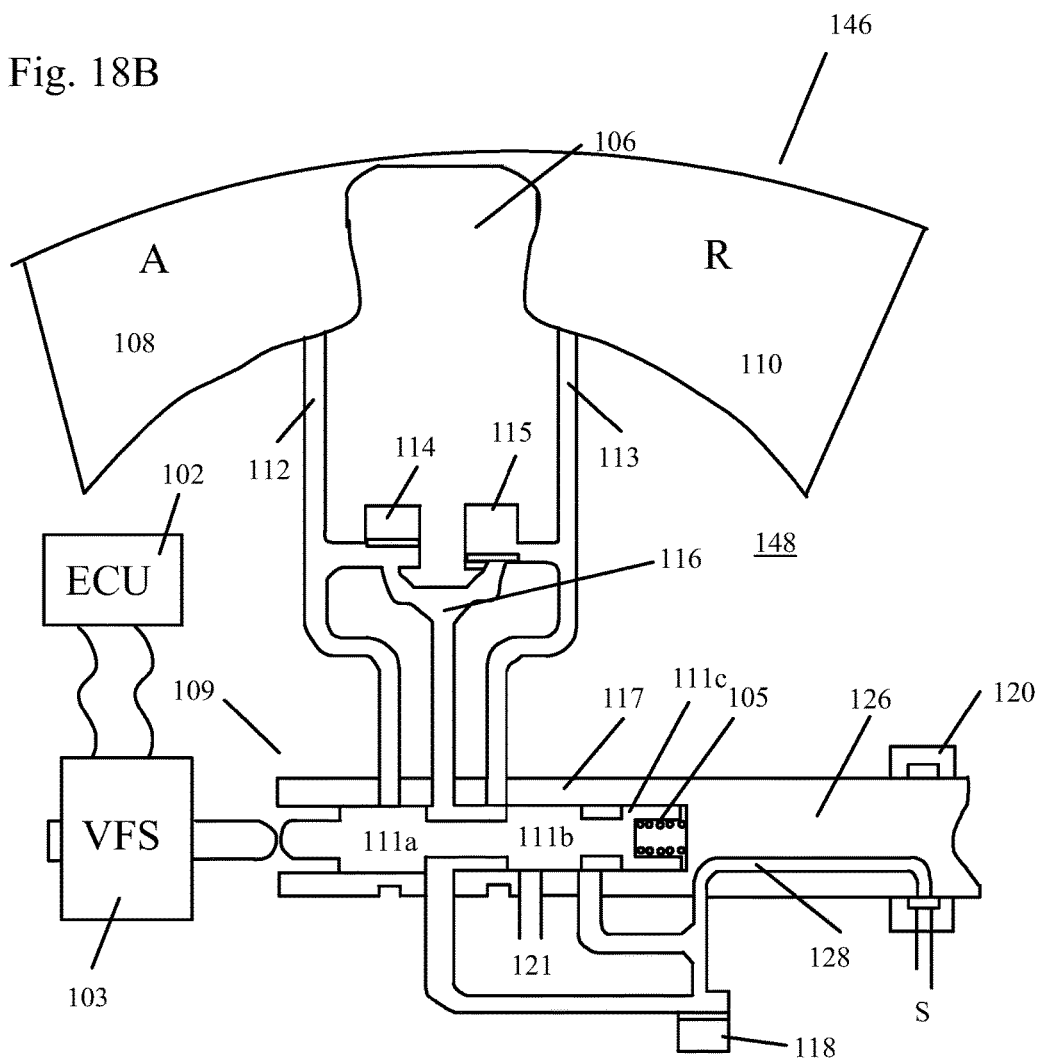
FIG. 18B shows a schematic of a cam torque actuated (CTA) phaser with a double flapper valve shifting towards advance.
Figure 18C:
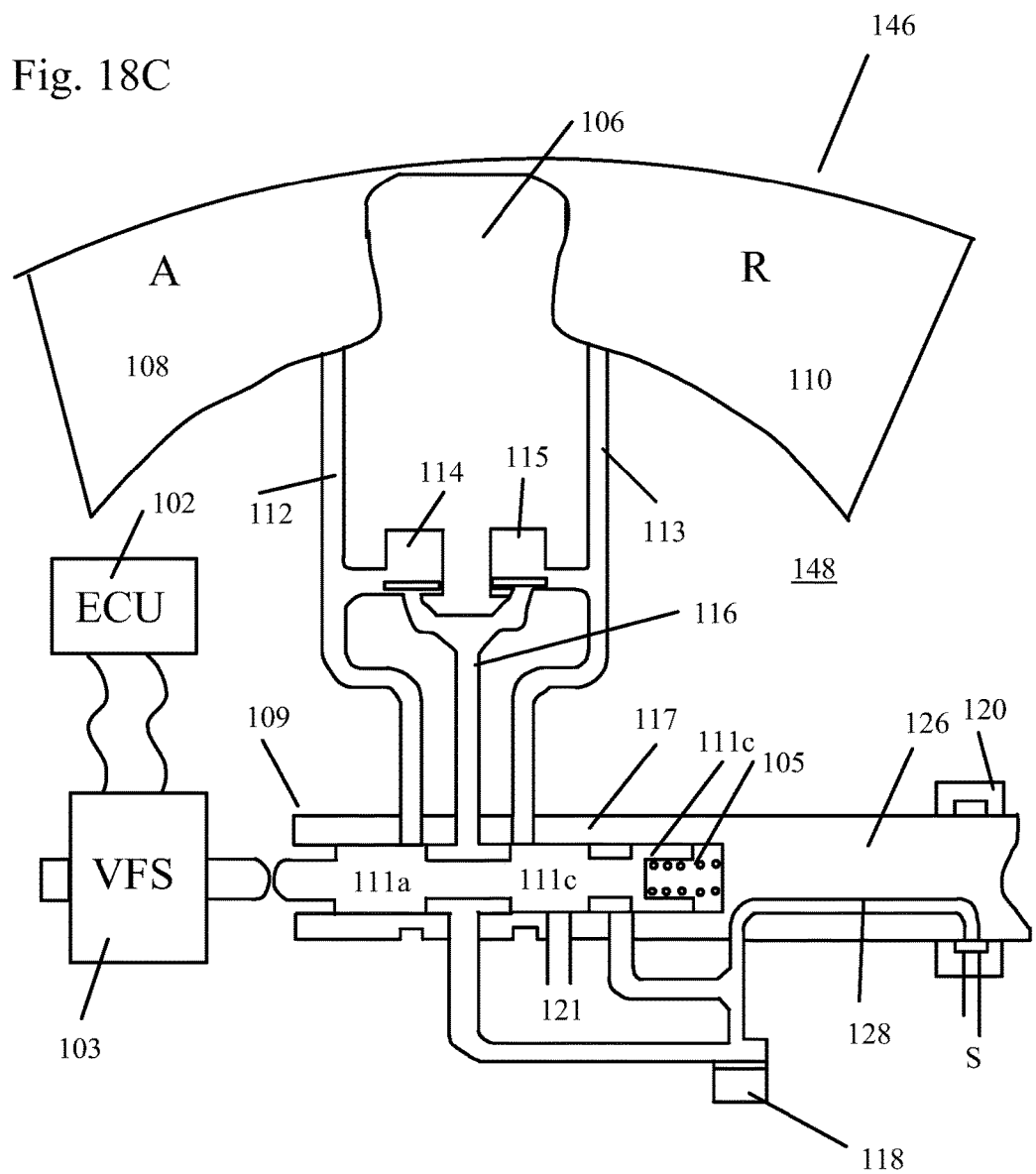
FIG. 18C shows a schematic of a cam torque actuated (CTA) phaser with a double flapper valve in the null position.

One example of a variable CTA variable cam timing system in which the double flapper valve could be used is shown in FIGS. 18A through 18C. Other CTA variable cam timing systems, including, but not limited to, systems with one or more lock pins, a different actuator, and/or detent circuits, may alternatively utilize the double flapper inlet check valve described herein. The positions shown in the figures define the direction the VCT phaser is moving to. It is understood that the phaser control valve has an infinite number of intermediate positions, so that the control valve not only controls the direction the VCT phaser moves, but depending on the discrete spool position, controls the rate at which the VCT phaser changes positions. Therefore, it is understood that the phaser control valve can also operate in infinite intermediate positions and is not limited to the positions shown in Figures.

A housing assembly 146 of the phaser has an outer circumference (not shown) for accepting drive force, an inner end plate (not shown) and an outer end plate (not shown). The rotor assembly 148 is connected to the camshaft and is coaxially located within the housing assembly 146. The rotor assembly 148 has a vane 106 separating a chamber formed between the housing assembly 146 and the rotor assembly 148 into an advance chamber 108 and a retard chamber 110. The vane 106 is capable of rotation to shift the relative angular position of the housing assembly 146 and the rotor assembly 148.

FIGS. 18A through 18C show a conventional cam torque actuated phaser (CTA). Torque reversals in the camshaft caused by the forces of opening and closing engine valves move the vane 106. The advance and retard chambers 108, 110 are arranged to resist positive and negative torque pulses in the camshaft and are alternatively pressurized by the cam torque.

The control valve 109 allows the vane 106 in the phaser to move by permitting fluid flow to recirculate from the advance chamber 108 to the retard chamber 110 or vice versa, depending on the desired direction of movement, as shown in FIGS. 18A and 18B. Positive cam torsionals are used to retard the phaser, as shown in FIG. 18A. Negative cam torsionals are used to advance the phaser, as shown in FIG. 18B. A null or central position, as shown in FIG. 18C, holds the phaser in position.

More specifically, in the retard position of the phaser, as shown in FIG. 18A, hydraulic fluid from the supply enters line 128 and moves through inlet check valve 118, which is a double flapper valve as described in any of the embodiments in FIG. 1-17 or 20-25, to the spool valve 109. As shown in the schematic, the spool valve 109 is internally mounted and comprises a sleeve 117 for receiving a spool 111 with lands 111a, 111b, 111c and a biasing spring 105. One of the advantages of locating the hydraulic control inside of the phaser is the decrease in the amount of modification of the engine required. A variable force solenoid (VFS) 103, which is controlled by an engine control unit (ECU) 102, moves the spool 111 within the sleeve 117 since the force of the VFS is greater than the force of the spring 105.

For the retard position, as shown in FIG. 18A, the spool 111 is moved to the left by spring 105 where the force of the spring is greater than the force of the VFS 103, spool land 111b blocks line 113 and most of exhaust line 121, spool land 111c blocks another exhaust line, and line 112 and 116 are open.

Cam torques move the vane either in a retard or advance direction, causing fluid to exit the chamber and to recirculate through the spool valve to the other chamber. Makeup fluid is supplied to the chambers as needed. To supply makeup fluid, fluid from the spool 111 flows to a common line 116 through either of the check valves 114, 115 which are open to either of the chambers 108, 110.

To advance the phaser, as shown in FIG. 18B, the spool 111 is moved by the VFS 103 to the right until the force of the VFS is equal to the force of the spring, so that spool land 111a and 111b do not block line 113, line 116, or any exhaust lines and spool land 111a blocks the exit of fluid from line 112. Fluid from the retard chamber 110 exits the chamber through line 113, which routes the fluid through the spool 111 between lands 111a and 111b. The fluid then enters line 116 and travels through open check valve 114 into line 112 and the advance chamber 108. In addition, as stated earlier only cam torsionals are used to move the vane 106. Additional makeup fluid is supplied by the supply through line 128 and double flapper inlet check valve 118 to the spool valve 109.

FIG. 18C shows the phaser in null or a central position where the spool lands 111a, 111b block lines 112 and 113 and vane 106 is held in position. Additional fluid is provided to the phaser to makeup for losses due to leakage.

Figure 19A:
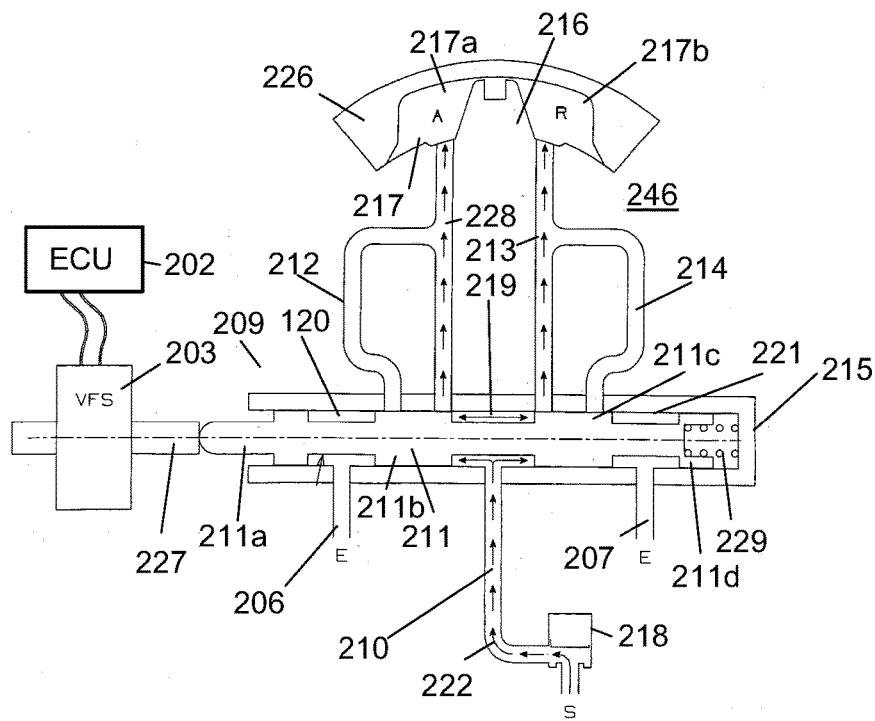
FIG. 19A shows a schematic of a torsion assist (TA) phaser with a double flapper valve in the null position.
Figure 19B:
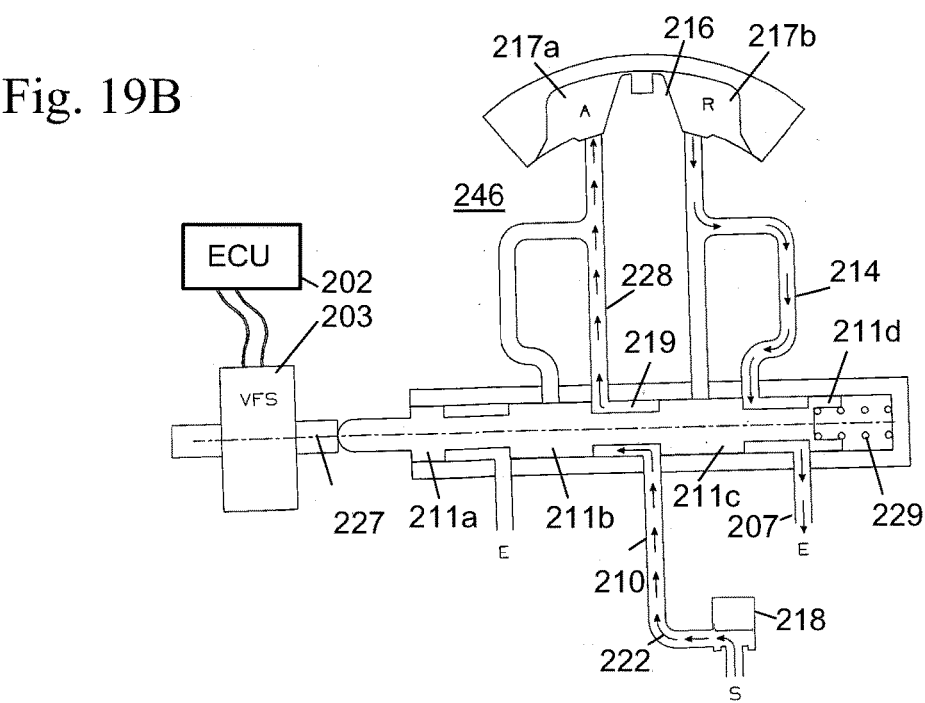
FIG. 19B shows a schematic of a torsion assist (TA) phaser with a double flapper valve in the advance position.
Figure 19C:
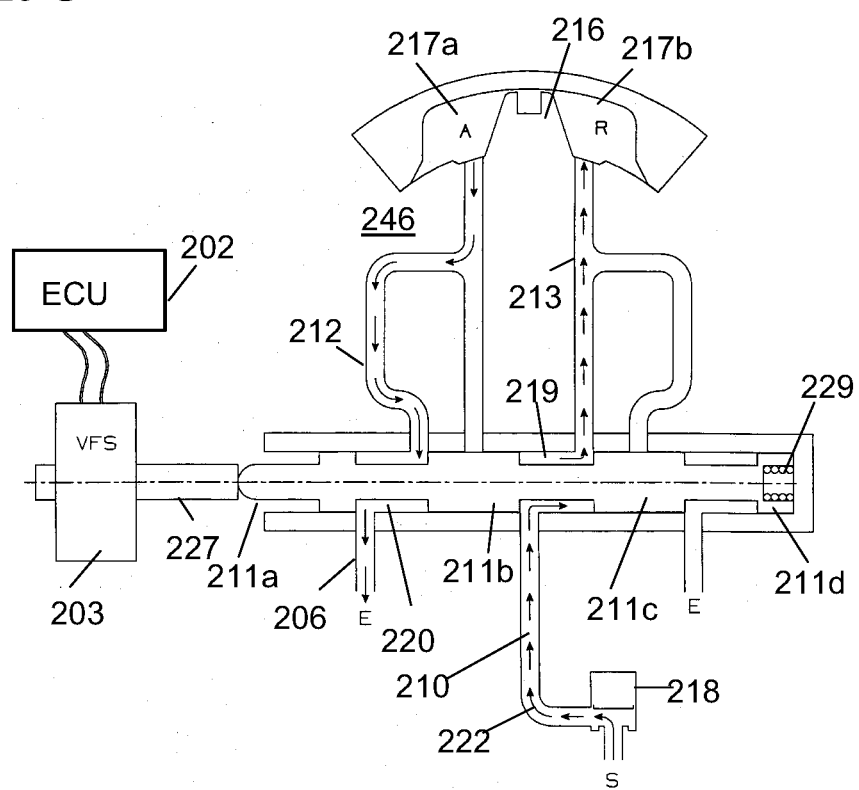
FIG. 19C shows a schematic of a torsion assist (TA) phaser with a double flapper valve in the retard position.

FIGS. 19A through 19C show the operating modes of a TA VCT phaser depending on the spool valve position. Other TA variable cam timing systems, including, but not limited to, systems with one or more lock pins, a detent circuit, and/or different actuators, may alternatively utilize the double flapper inlet check valve described herein. The positions shown in the figures define the direction the VCT phaser is moving to. It is understood that the phaser control valve has an infinite number of intermediate positions, so that the control valve not only controls the direction the VCT phaser moves, but depending on the discrete spool position, controls the rate at which the VCT phaser changes positions. Therefore, it is understood that the phaser control valve can also operate in infinite intermediate positions and is not limited to the positions shown in Figures.

A housing assembly 226 of the phaser has an outer circumference (not shown) for accepting drive force, an inner end plate and an outer end plate. The rotor assembly 246 is connected to the camshaft and is coaxially located within the housing assembly 226. The rotor assembly 246 has a vane 216 separating a chamber formed between the housing assembly 226 and the rotor assembly 246 into an advance chamber 217a and a retard chamber 217b. The vane 216 is capable of rotation to shift the relative angular position of the housing assembly 226 and the rotor assembly 246.

Oil pressure from an oil supply moves the vane 216. The control valve 209 allows the vane in the phaser to move by permitting fluid flow from the supply to the advance chamber 217a and from the retard chamber 217b to an exhaust line 206, 207 or from supply to the retard chamber 217b and from the advance chamber 217a to an exhaust line 206, 207, depending on the desired direction of movement.

The vanes 216 of the rotor assembly 246 fit in radially outwardly projecting recesses or chambers 217, of the housing assembly 226. The phaser operating fluid 222, illustratively in the form of engine lubricating oil, flows into the chambers 217a (labeled "A" for "advance") and 217b (labeled "R" for "retard") by way of a common inlet line 210. An inlet check valve 218, which is preferably a double flapper check valve as described in any of the embodiments of FIG. 1-17 or 20-25, prevents the hydraulic fluid from backflow into the engine oil supply. Inlet line 210 terminates as it enters the spool valve 209. The spool valve 209 is made up of a spool 211 with lands 211a, 211b, 211c, 211d is slidably received with a sleeve 215. The spool 211 may be a vented spool.

Control of the position of spool 211 within sleeve 215 is in direct response to a variable force solenoid 203. The variable force solenoid 203 is preferably an electromechanical actuator 203. U.S. Pat. No. 5,497,738, entitled "VCT Control with a Direct Electromechanical Actuator", which discloses the use of a variable force solenoid, issued Mar. 12, 1996, is herein incorporated by reference. Briefly, an electrical current is introduced via a cable through the solenoid housing into a solenoid coil which repels, or "pushes" an armature 227 in the electromechanical actuator 203. The armature 227 bears against spool land 211a of spool 211, thus moving spool 211 to the right. If the force of spring 229 is in balance with the force exerted by armature 227 in the opposite direction, spool 211 will remain in its null or centered position. Thus, the spool 211 is moved in either direction by increasing or decreasing the current to the solenoid coil, as the case may be. In an alternative embodiment, the configuration of electromechanical actuator 203 may be reversed, converting the force on spool land 211*a* from a "push" to a "pull." This alternative requires the function of spring 229 to be redesigned to counteract the force in the new direction of armature 217 movement.

The variable force electromechanical actuator 203 allows the spool valve to be moved incrementally instead of only being capable of full movement to one end of travel or the other, as is common in conventional camshaft timing devices. The use of a variable force solenoid eliminates slow dynamic response. The faster response allows the use of increased closed-loop gain, making the system less sensitive to component tolerances and operating environment. Also, a variable force solenoid armature only travels a short distance, as controlled by the current from the Engine Control Unit (ECU) 202. In a preferred embodiment, an electronic interface module (EIM) provides electronics for the VCT. The EIM interfaces between the actuator 203 and the ECU 202.

Preferred types of variable force solenoids include, but are not limited to, a cylindrical armature, or variable area, solenoid, and a flat faced armature, or variable gap, solenoid. The electromechanical actuator employed could also be operated by a pulse-width modulated supply. Alternatively, other actuators such as hydraulic solenoids, stepper motors, worm- or helical-gear motors or purely mechanical actuators could be used to actuate the spool valve.

To maintain a phase angle, the spool 211 is positioned at null, as shown in FIG. 19A. The camshaft is maintained in a selected intermediate position relative to the crankshaft of the associated engine, referred to as the "null" position of the spool 211. Make up oil from the supply fills both chambers 217*a* and 217*b*. When the spool 211 is in the null position, spool lands 211*b* and 211*c* block both of the return lines 212 and 214, as well as inlet lines 228 and 213.

Since the hydraulic fluid 222 is essentially trapped in the center cavity 219 of the spool valve 209, the pressure is maintained, and hydraulic fluid 222 does not enter or leave either of the chambers 217*a* and 217*b*. However, there is inevitably leakage from the chambers 217*a* and 217*b*. So, the spool valve is "dithered" to allow a small bit of movement. That is, the spool 211 wiggles back and forth enough so that if the advance 217*a* and retard 217*b* chambers begin losing pressure, make-up fluid 222 restores the pressure. However, the movement is not sufficient to let fluid out exhaust ports 206, 207. Center cavity 219 is preferably tapered at the edges to allow easier transport of make-up fluid during dithering.

Referring to FIG. 19B, to advance the phaser, source hydraulic fluid 222 is ported to the advance chamber 217*a* by shifting the spool 211 to the left. At the same time, the retard chamber 217*b* is exhausted to sump through line 207 that is, to a location of lower pressure, where the fluid may be recycled back to the fluid source. In most cases, "atmosphere" means into a location where the engine oil can drain back into the oil pan at the bottom of the engine, for example into the timing chain cover or a return line connected to the oil pan. In this configuration, land 211*c* blocks the entrance of hydraulic fluid into the retard chamber inlet line 213. Cavity 219 is now lined up with advance chamber inlet line 228, allowing additional hydraulic fluid 222 to enter the retard chamber 217*b*. Land 211*b* blocks the exit of hydraulic fluid 222 from the advance chamber return line 212. Cavity 221 allows the exhaust of hydraulic fluid 222 through the retard chamber return line 214 and out the retard chamber exhaust 207 to atmosphere.

Referring to FIG. 19C, to retard the phaser, the spool valve 211 is moved to the right, and source hydraulic fluid 222 is ported to the retard chamber 217*b* and the hydraulic fluid 222 in the advance chamber 217*a* is exhausted to the atmosphere. In this configuration, land 211*c* blocks the exit of hydraulic fluid from retard chamber return line 214. Cavity 219 is now lined up with retard chamber inlet line 213, allowing hydraulic fluid 222 into the retard chamber 217*b*. Land 211*b* blocks the entry of hydraulic fluid 222 into advance chamber inlet line 228. Cavity 220 allows the exhaust of hydraulic fluid 222 through the advance chamber return line 212 and out the advance chamber exhaust 206 to atmosphere.

While FIGS. 18A-19C show specific types of phasers, the double flapper valves described herein could be used in any hydraulic cam phaser that uses an inlet check valve.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An inlet check valve for controlling fluid from a supply into a variable cam timing phaser comprising:
    a double flapper check valve assembly with an open position and a closed position, the double flapper check valve comprising:
    a housing having a body forming at least two stoppers;
    a flapper valve comprising at least two flexible flaps received within the housing and aligned with the at least two stoppers; and
    a valve seat received within the housing, the valve seat defining openings aligned with the at least two flexible flaps, axially opposite the two stoppers;
    wherein when fluid flows through the openings of the valve seat, the fluid pushes the at least two flaps away from the valve seat and towards the at least two stoppers, permitting the flow of fluid into the variable cam timing phaser; and
    wherein when fluid flows from the body onto the at least two flaps, the fluid pushes the at least two flaps towards the valve seat, sealing the openings of the valve seat and preventing fluid from entering the supply.

2. The inlet check valve of claim 1, wherein the at least two stoppers are shaped to limit the movement of the at least two flexible flaps.

3. The inlet check valve of claim 1, the housing further comprising a lip defining a protrusion for securing the valve seat and flapper valve to the housing.

4. The inlet check valve of claim 1, wherein the housing is manufactured by an overmolding process.

5. The inlet check valve of claim 1, wherein the double flapper check valve assembly further comprises a filter located adjacent to the valve seat.

6. The double flapper valve assembly of claim 1, further comprising a sleeve that contains a spool valve of the variable cam timing system, wherein the housing and the sleeve have holes that create passages for oil flow and are reversibly connectable.

7. The double flapper valve assembly of claim 6, wherein a top of the sleeve is shaped to receive the stoppers of the housing when the sleeve and the housing are connected.

8. The double flapper valve assembly of claim 1, wherein the double flapper valve assembly is located in a center bore of a rotor.

9. The double flapper valve assembly of claim 1, wherein a total passage of oil into the phaser is about 40 mm$^2$.

10. An inlet check valve for controlling fluid from a supply into a variable cam timing phaser comprising:
- a double flapper check valve assembly with an open position and a closed position, the double flapper check valve comprising:
- a housing having a body;
- a flapper valve comprising at least two flexible flaps received within the housing;
- a stopper piece comprising two stopper wings aligned with the at least two flexible flaps; and
- a valve seat received within the housing, the valve seat defining openings aligned with the at least two flexible flaps, axially opposite the two stopper wings;
- wherein when fluid flows through the openings of the valve seat, the fluid pushes the at least two flaps away from the valve seat and towards the at least two stopper wings, permitting the flow of fluid into the variable cam timing phaser; and
- wherein when fluid flows from the body onto the at least two flaps, the fluid pushes the at least two flaps towards the valve seat, sealing the openings of the valve seat and preventing fluid from entering the supply.

11. The inlet check valve of claim 10, the housing further comprising a lip defining a protrusion for securing the valve seat, the flapper valve and the stopper piece to the housing.

12. The inlet check valve of claim 10, wherein the double flapper check valve assembly further comprises a filter located adjacent to the valve seat.

13. The inlet check valve of claim 10, further comprising a sleeve that contains a spool valve of the variable cam timing system, wherein the housing and the sleeve have holes that create passages for oil flow and are reversibly connectable.

14. The inlet check valve of claim 13, wherein each of the flapper valve, the stopper piece, the valve seat and the housing have holes opposite each other on an outer circumference, and the sleeve comprises two protrusions shaped to fit in the holes when the sleeve and the housing are assembled.

15. The double flapper valve assembly of claim 10, wherein the double flapper valve assembly is located in a center bore of a rotor.

* * * * *